United States Patent
Pan et al.

(10) Patent No.: US 12,484,086 B2
(45) Date of Patent: Nov. 25, 2025

(54) METHODS AND SYSTEMS OF LBT ADAPTATION AND BEAM OPERATION WITH INTERFERENCE HANDLING FOR SUPPORTING NR ABOVE 52.6 GHZ

(71) Applicant: INTERDIGITAL PATENT HOLDINGS, INC., Wilmington, DE (US)

(72) Inventors: Kyle Pan, Saint James, NY (US); Patrick Svedman, Stockholm (SE); Guodong Zhang, Woodbury, NY (US); Allan Tsai, Boonton, NJ (US); Mohamed Awadin, San Diego, CA (US); Pascal Adjakple, Great Neck, NY (US); Yifan Li, Conshohocken, PA (US); Zhuo Chen, Claymont, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 351 days.

(21) Appl. No.: 18/249,165

(22) PCT Filed: Oct. 15, 2021

(86) PCT No.: PCT/US2021/055206
§ 371 (c)(1),
(2) Date: Apr. 14, 2023

(87) PCT Pub. No.: WO2022/081988
PCT Pub. Date: Apr. 21, 2022

(65) Prior Publication Data
US 2024/0032093 A1    Jan. 25, 2024

Related U.S. Application Data

(60) Provisional application No. 63/261,886, filed on Sep. 30, 2021, provisional application No. 63/092,059, filed on Oct. 15, 2020.

(51) Int. Cl.
*H04W 74/08*    (2024.01)
*H04W 72/23*    (2023.01)
(Continued)

(52) U.S. Cl.
CPC ..... *H04W 74/0808* (2013.01); *H04W 72/232* (2023.01); *H04W 74/006* (2013.01)

(58) Field of Classification Search
None
See application file for complete search history.

(56) References Cited

U.S. PATENT DOCUMENTS

| 7,801,096 B2 * | 9/2010 | Myles | H04W 16/14 455/434 |
| 2016/0088618 A1 * | 3/2016 | Barriac | H04W 74/0816 370/329 |

(Continued)

FOREIGN PATENT DOCUMENTS

| WO | 2019/210185 A1 | 10/2019 |
| WO | 2020/125121 A1 | 6/2020 |

*Primary Examiner* — Alpus Hsu
(74) *Attorney, Agent, or Firm* — Flaster Greenberg P.C.

(57) ABSTRACT

LBT adaptation, beam operation, and/or interference handling may be performed by wireless communication devices in NR above 52.6 GHZ. In an example, a wireless communications device may send information on a channel. The channel may comprise a Physical Downlink Control Channel (PDCCH), a Physical Downlink Shared Data Channel (PDSCH), or a Physical Random Access Channel (PRACH). The wireless communications device may receive, from a user equipment (UE), one or more ready to receives (RTRs). The wireless communications device may determine, based on a number of consecutive RTRs of the one or more RTRs, a listen before talk (LBT) mode. The LBT mode may be associated with staying or switching to a no receiver assistance mode or staying or switching to a receiver assistance mode.

20 Claims, 31 Drawing Sheets

(51) Int. Cl.
*H04W 72/232* (2023.01)
*H04W 74/00* (2009.01)
*H04W 74/0808* (2024.01)

(56) References Cited

U.S. PATENT DOCUMENTS

| | | | |
|---|---|---|---|
| 2019/0373635 A1* | 12/2019 | Yang | H04B 7/0695 |
| 2020/0112996 A1* | 4/2020 | Pan | H04L 12/413 |
| 2020/0260487 A1* | 8/2020 | Bhattad | H04W 74/0808 |
| 2020/0359426 A1* | 11/2020 | Pan | H04W 16/14 |
| 2021/0051718 A1* | 2/2021 | Bhattad | H04W 72/23 |
| 2021/0274555 A1* | 9/2021 | Alfarhan | H04W 74/0808 |
| 2022/0078686 A1* | 3/2022 | Yiu | H04W 36/00 |
| 2022/0086669 A1* | 3/2022 | Yao | H04L 43/20 |
| 2022/0104051 A1* | 3/2022 | Yao | H04W 24/10 |
| 2022/0131676 A1* | 4/2022 | Zhang | H04L 5/001 |
| 2022/0369344 A1* | 11/2022 | Liu | H04W 72/20 |

\* cited by examiner

METHODS AND SYSTEMS OF LBT ADAPTATION AND BEAM OPERATION WITH INTERFERENCE HANDLING FOR SUPPORTING NR ABOVE 52.6 GHZ

CROSS-REFERENCE TO RELATED APPLICATIONS

This application is the National Stage Application of International Patent Application No. PCT/US2021/055206, filed Oct. 15, 2021, which claims the benefit of U.S. Provisional Patent Application No. 63/092,059, filed Oct. 15, 2020, and U.S. Provisional Patent Application No. 63/261,886, filed Sep. 30, 2021, which are hereby incorporated by reference in their entirety.

BACKGROUND

Frequencies above 52.6 GHz are faced with challenges, such as higher phase noise, larger propagation loss due to high atmospheric absorption, lower power amplifier efficiency, and strong power spectral density regulatory requirements in unlicensed bands, compared to lower frequency bands. Additionally, the frequency ranges above 52.6 GHz potentially contain larger spectrum allocations and larger bandwidths that are not available for bands lower than 52.6 GHz. Accordingly, there is a need for improved support for frequencies above 52.6 GHz.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for LBT adaptation, beam operation, interference handling in NR above 52.6 GHz. Solutions of unified LBT adaptation scheme are proposed. Unified LBT methods and solutions that could cope with different conditions in unlicensed spectrum wireless environment are described herein. A unified LBT scheme may integrate multiple and several different LBT methods in a same system to enable efficient system operation and optimize system performance. In an example, a wireless communications device may send information on a channel. The wireless communications device may receive, from a UE, one or more ready to receives (RTRs). The wireless communications device may determine, based on a number of consecutive RTRs of the one or more RTRs, a listen before talk (LBT) mode. The channel may comprise a Physical Downlink Control Channel (PDCCH), a Physical Downlink Shared Data Channel (PDSCH), or a Physical Random Access Channel (PRACH). The LBT mode may be associated with staying or switching to a no receiver assistance mode. The LBT mode is associated with staying or switching to a receiver assistance mode.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1:
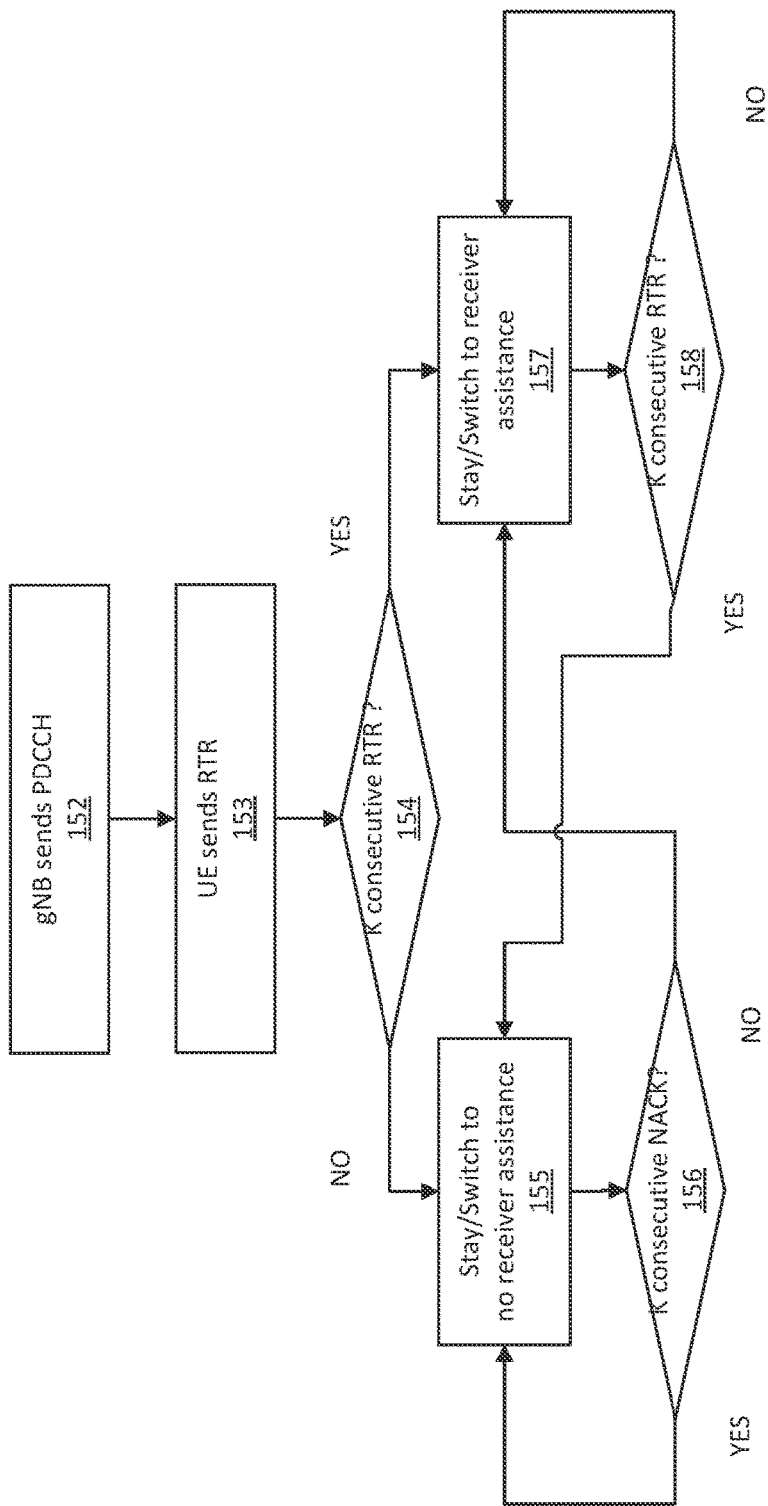
FIG. 1 shows as mechanism of LBT sub-mode switching with receiver assisted LBT sub-mode as initial state.

Methods and apparatuses are described herein for LBT adaptation, beam operation, interference handling in NR above 52.6 GHz.

The following abbreviations and definitions may be used herein:
A/N Ack/Nack
BRS Beam Reference Signal
BWP Bandwidth Part
CA Carrier aggregation
CBR Channel Busy Ratio
CBW Channel Bandwidth
CCA Clear channel assessment
CE Control Element
COT Channel Occupation Time
CRB Carrier Resource Block
CSI Channel State Information
DL Downlink
DMRS DeModulation Reference signal
DRS Discovery Reference Signal
DRX Discontinuous Reception
eMBB enhanced Mobile Broadband
FR1 Frequency Range 1
FR2 Frequency Range 2
FR4 Frequency Range 4
GNSS Global Navigation Satellite System
HARQ Hybrid Automatic Repeat Request
LAA Licensed-assisted access
LBT Listen Before Talk
LTE Long term Evolution
MAC Medium Access Control
MIB Master Information Block
NACK Non-ACKnowledgement
NR New Radio
NR-U New Radio Unlicensed
PBCH Physical Broadcast Channel
PDCCH Physical Downlink Control Channel
PDSCH Physical Downlink Shared Data Channel
PRACH Physical Random Access Channel
PRB Physical Resource Block
RAN Radio Access Network
RAT Radio Access Technology
RMSI Remaining Minimum System Information
RNTI Radio Network Temporary Identifier
RRC Radio Resource Control
RTR Ready To Receive
RTT Ready To Transmit
RX Receiver
SI System Information
SIB System Information Block
SRS Sounding Reference Signal
SS Synchronization Signal
SSB Synchronization Signal Block
TCI Transmission Configuration Index
TDD Time Division Duplex
TX Transmitter
UE User Equipment
UL Uplink
URLLC Ultra-Reliable and Low Latency Communications In order to a support wide range of services, 5G NR systems aim to be flexible enough to meet the connectivity requirements of a range of existing and future (as yet unknown) services to be deployable in an efficient manner. In particular, NR may support potential use of frequency ranges up to 100 GHz.

NR specifications that have been developed in Rel-15 and Rel-16 define operation for frequencies up to 52.6 GHz, where all physical layer channels, signals, procedures, and protocols are designed to be optimized for uses under 52.6 GHz.

However, frequencies above 52.6 GHz are faced with more difficult challenges, such as higher phase noise, larger propagation loss due to high atmospheric absorption, lower power amplifier efficiency, and strong power spectral density regulatory requirements in unlicensed bands, compared to lower frequency bands. Additionally, the frequency ranges above 52.6 GHz potentially contain larger spectrum allocations and larger bandwidths that are not available for bands lower than 52.6 GHz.

As an initial effort to enable and optimize 3GPP NR systems for operation above 52.6 GHz, 3GPP RAN has studied requirements for NR beyond 52.6 GHz and up to 114.25 GHz including global spectrum availability and regulatory requirements (including channelization and licensing regimes), potential use cases and deployment scenarios, and NR system design requirements and considerations on top of the regulatory requirements. The potential use cases identified in the study include high data rate eMBB, mobile data offloading, short range high-data rate D2D communications, broadband distribution networks, integrated access backhaul (IAB), factory automation, industrial IoT (IIOT), wireless display transfer, augmented reality (AR)/virtual reality (VR) wearables, intelligent transport systems (ITS) and V2X, data center inter-rack connectivity, smart grid automation, private networks, and support of high positioning accuracy. The use cases span over several deployment scenarios identified in the study. The deployment scenarios include, but are not limited to, indoor hotspot, dense urban, urban micro, urban macro, rural, factor hall, and indoor D2D scenarios. The study also identified several system design requirements around waveform, MIMO operation, device power consumption, channelization, bandwidth, range, availability, connectivity, spectrum regime considerations, and others.

Among the frequencies of interest, frequencies between 52.6 GHz and 71 GHz are especially interesting relatively in the short term because of their proximity to sub-52.6 GHz for which the current NR system is optimized and the imminent commercial opportunities for high data rate communications, e.g., unlicensed spectrum and licensed spectrum between 57 GHz and 71 GHz.

NR Rel-15 defined two frequency ranges for operation: FR1 spanning from 410 MHz to 7.125 GHz; and FR2 spanning from 24.25 GHz to 52.6 GHz.

The proximity of this frequency range (57-71 GHz) to FR2 and the imminent commercial opportunities for high data rate communications makes it compelling for 3GPP to address NR operation in this frequency regime. In order to minimize the specification burden and maximize the leverage of FR2 based implementations, 3GPP has decided to extend FR2 operation up to 71 GHz with the adoption of one or more new numerologies (i.e., larger subcarrier spacings). These new numerologies may be identified by the study on waveforms for NR>52.6 GHz. NR-U defined procedures for operation in unlicensed spectrum that may also be leveraged towards operation in the unlicensed 60 GHz band. NR operation may support up to 71 GHz considering, both, licensed and unlicensed operation, similar to regular NR and NR-U operations below 52.6 GHz, and NR/NR-U operation in the 52.6 GHz to 71 GHz that can be in stand-alone or aggregated via CA or DC with an anchor carrier.

In Release-16 New Radio Unlicensed (NR-U), the supported numerology (i.e., SCS) can be set as 15, 30 and 60 KHz. The listen before talk (LBT) bandwidth is set to 20 MHz in Release-16 NR-U. Based on the minimum LBT bandwidth that must be supported, the DL initial BWP is nominally 20 MHz for Rel-16 NR-U. The maximum supported channel bandwidth is set to 100 MHz. The UE channel bandwidth (or an activated BWP) can be set as an integer multiple of LBT bandwidth (i.e. 20 MHz). For instance, for SCS=30 KHz, the total allocated PRB numbers for 20 MHz, 40 MHz and 80 MHz bandwidth is equal to 48, 102, and 214, respectively.

In Release-16 NR-U, the PRBs allocated by frequencyDomainResources in the CORESET configuration are confined within one of the LBT bandwidths within the BWP corresponding to the CORESET. In this way, a PDCCH is confined within an LBT bandwidth in order to avoid partial puncturing of a DCI. A UE can stop monitoring PDCCH searching spaces on LBT bandwidth not available after acquiring the knowledge of transmitted LBT bandwidth(s) from GC-PDCCH. Within the search space set configuration associated with the CORESET, each of the one or more monitoring locations in the frequency domain corresponds to (and is confined within) an LBT bandwidth and has a frequency domain resource allocation pattern that is replicated from the pattern configured in the CORESET. In this way, CORESET parameters other than frequency domain resource allocation pattern is identical for each of the one or more monitoring locations in the frequency domain.

There are issues associated with the unified LBT adaptation scheme. LBT may be used to allow proper system operation in 52.6 GHz and above. A specific LBT mechanism may be predefined and specified for this purpose. LBT could have different methods. One LBT method may be more suitable than other LBT methods depending on conditions such as interference. Incorporating LBT methods may enable efficient and optimal system operation for 52.6 GHz and above.

There are issues associated with resource under-utilization and interference handling. In some systems, when a transmitter fails LBT, the transmitter is not allowed for transmission. This could cause resource under-utilization. For example, the exposed node issue could cause under-utilization for system resources. However, when a transmitter fails LBT while a receiver succeeds LBT, the transmitter may still be able to make transmission to the receiver. This could increase resource utilization and the ability to meet more stringent QoS requirements. There is a need for methods for enabling better utilization for resources for 52.6 GHz system, and the ability to meet more stringent QoS requirements such as latency requirements.

Enhancements to beam operation are described herein. A hidden node could cause interference at a receiver when the transmitter is not aware of the hidden node. When the transmitter passes LBT, it may make the transmission to receiver. However, the receiver may not be able to receive the data correctly due to the hidden node's interference. Solutions to address the hidden node issue in a 52.6 GHz beam-centric system and above, i.e. solutions to identify false successful LBT at the transmitter or solutions to identify successful LBT at the transmitter that would have failed LBT at the receiver, need to be specified so that data transmissions by the transmitter in the presence of an exposed node at a receiver not visible to the transmitter and the related waste of radio resources can be avoided. Addressing this issue is critical because this helps ensure the ability to meet more stringent QoS requirements and enables a better utilization of the system resources.

There are issues associated with the coexistence mechanism for LBT mode. In 52.6 GHz systems, LBT may be used. However, when interference is static or not present, no-LBT mode may be used. Therefore, in some conditions, LBT may be required. In other conditions, LBT may not be required. It is desirable to design a coexist mechanism for LBT mode and no-LBT mode in 52.6 GHz system. There is a need to detect when to use LBT and when not to use LBT.

The embodiments described herein address the above issues.

A unified LBT adaptation scheme is described herein. Unified LBT methods and solutions that could cope with different conditions in an unlicensed spectrum wireless environment are proposed. A unified LBT scheme may integrate multiple and several different LBT methods in a same system to enable efficient system operation and optimize system performance. An efficient LBT adaptation mechanism is proposed. Hybrid schemes may be used. Whether to use periodic, or explicit aperiodic RTR (based on explicit RTR request signaling) or implicit aperiodic RTR (e.g., based on rules and/or measurements) may be adaptive or configured. It may be UE autonomous or NW control.

Enhancements of resource under-utilization and interference are described herein. Solutions to handle interferences using single/dual LBT results or LBT results based signaling are proposed. A receiver may send a Ready to Receive (RTR). Periodic RTR reporting may be used. A receiver may send a RTR with or without a Ready to Transmit (RTT). The CSI/RTR control field in a DCI format may be configured, e.g., by RRC. The solutions may comprise a very short signal, RTT, RTR, PDCCH, GC-PDCCH, or any combination thereof. The gNB may send an RTT signal and/or an RTR request signal with additional assistance information or an indication of interference with a UE or with a group of UEs in a group common PDCCH.

Enhancements to beam operation for hidden node handling are described herein. Solutions for enabling fast RTR feedback are developed. The gNB may indicate multiple beams for PDSCH receiving, e.g., by indicating a TCI codepoint corresponding to two TCI states. A UE may perform LBT for the two or multiple beams and send an RTR for each of two or multiple beams. One beam may be primary beam, and the other beam may be secondary beam. A UE may indicate interference ranking in addition to RTR for multiple beams, e.g., the primary and secondary beams to assist interference mitigation and enable efficient beam operation.

A coexistence mechanism for LBT mode and no-LBT mode is described herein. Solutions to enable coexistence of LBT mode and non-LBT mode in a flexible way are proposed. LBT mode may be triggered at the gNB or the UE. The gNB may indicate the selected LBT mode to the UE. The UE may report the selected LBT mode to the gNB. The gNB may determine the final LBT mode based on the reported LBT mode from the UE(s). The UE may decide the LBT mode autonomously and perform the selected LBT before transmission. LBT adaptation may be performed per cell or per UE. The LBT mode or sub-mode may be indicated to the UE in a per cell manner or per UE manner, per beam or a beam pair, per beam group manner, per CC manner, or a combination thereof. For example, system information or broadcast information may be used to indicate the LBT mode or sub-mode to the UE in a per cell manner. Higher layer signaling or L1/2 signaling may be used to indicate the LBT mode or sub-mode to the UE in a per UE manner. The RRC, MAC CE or DCI in the PDCCH may be used to indicate the LBT mode or sub-mode to the UE in a per UE manner.

Quasi-colocation (QCL) may be used to determine a sensing beam a from transmission beam (with and without UE beam correspondence). Beam correspondence may be used to determine a sensing beam from a transmission beam. A transmission configuration indication (TCI) and spatial relation information may be used to indicate a sensing beam or beams associated with a transmission beam or beams. A sensing beam may be selected to be the same as a UL transmission beam at the UE. Beam correspondence may be assumed at UE. If a UE transmission beam corresponds to a certain TCI state for a certain UE, the UE may use the same beam for sensing. If a TCI is used as a QCL source (e.g., Type D QCL) for another TCI for a certain UE, then the UE transmission beam corresponding to the another TCI may be used as the sensing beam for transmission with the TCI. However, if TCI is not used as QCL source (e.g., Type D QCL) for the TCI for any UE, then the UE may not use the transmission beam that corresponds to this TCI as the sensing beam for transmission with the TCI. However, if beam correspondence is not supported at UE, then Y dB beamwidth sensing beam may be used. For example, Y may be 3 dB.

Sensing beam determination for TCI and unified TCI, fast LBT mode switching, sensing beam determined based on QCL-ed transmission beam or X dB beamwidth based on configuration, beam correspondence and unified/non-unified TCI approaches.

The incorporation of multiple LBT methods into a system is described herein. A mechanism and system to handle more than one LBT method and support for multiple LBT methods is described.

The unified LBT method may handle different conditions in a wireless environment. A unified LBT scheme may integrate multiple, different LBT methods in a same system. An efficient LBT adaptation mechanism is proposed.

When LBT mode is used, there can be several different sub-modes for the LBT mode. For example, there could be LBT sub-modes such as an omni-directional LBT, a directional LBT, a receiver assisted LBT, and no LBT. The techniques described herein allow multiple LBT sub-modes in a system. When LBT sub-modes coexist, there is a need for a mechanism for adapting and switching between different LBT sub-modes. For example, there is a need to account for the conditions and criteria for triggering the LBT sub-mode switching and adaptation. LBT adaptation, switching and triggering may be based on exposed node status, hidden node status, interference either dynamic or semi-static, measurements, LBT results from peer node(s), or the like.

To optimize the system performance, one solution may be to have a system with multiple LBT sub-modes coexisting in a same system. For example, one LBT sub-mode may be omni-directional LBT. Another LBT sub-mode may be directional LBT. Yet another LBT sub-mode may be receiver assisted LBT. Different LBT sub-modes may be adaptively used depending on condition(s) and/or scenario(s).

Dynamic or semi-static approaches may be used to switch LBT sub-modes. To switch LBT sub-modes fast, a DCI-based approach may be used. To switch the LBT sub-mode for a specific UE, UE-specific DCI may be used. To switch LBT sub-modes for a group of UEs, group common DCI may be used. Group common PDCCH (GC-PDCCH) may be used to deliver LBT sub-mode switching indications to a group of UEs. This may be based on a number of UEs or a number of active UEs, interference for beams, channel busy ratio (CBR) for omni-directional beams or directional beams, etc.

The conditions and/or criteria for triggering LBT sub-mode switching and/or adaptation. e.g., based on hidden node status, interference either dynamic or semi-static, measurement, LBT results from peer node(s), etc. are described herein. NW control switching and/or UE autonomous switching for LBT sub-mode switching may be used. For example, if interference is uniformly distributed in all directions, e.g., beam directions, then omni-directional LBT sub-mode may be used. On the other hand, if interference is non-uniformly distributed and concentrated at a particular direction(s), e.g., certain beam direction(s), then directional LBT sub-mode may be used. Interference may be measured based on LBT measurements. Hidden nodes may cause interference for reception. If the hidden node issue is not severe, the regular non-receiver assisted LBT sub-mode may be used. On the other hand, if the hidden node is severe, then receiver assisted LBT sub-mode may be used. A gNB may configure some threshold(s) e.g., RSRP threshold, RSSI threshold values which the UE may use to autonomously switch between different LBT sub-modes.

It is proposed that the gNB indicate the LBT sub-mode to the UE. For example, the gNB may indicate the LBT mode or sub-mode to the UE in a cell-specific manner. The UEs in a cell may receive a cell-specific indication for the LBT mode or sub-mode. Such cell-specific indications for the LBT mode or sub-mode may be carried in system information, a broadcast signal or channel, or the like. The UEs in a cell may use the same LBT mode or sub-mode. For example, the gNB may indicate the LBT mode or sub-mode to the UE in a UE-specific manner. A UE may receive UE-specific indication for the LBT mode or sub-mode. Such a UE-specific indication for the LBT mode or sub-mode may be carried in UE dedicated RRC signaling, MAC CE, DCI in PDCCH, or the like. Different UEs may use different LBT modes or sub-modes. The gNB may indicate to the UE to switch to the omni-directional or directional LBT sub-mode from the receiver assisted LBT sub-mode, and vice versa. For example, if a UE operates in the directional LBT receiver assisted sub-mode and sends K consecutive ready to receive (RTR), then the gNB may indicate to the UE to switch to directional LBT sub-mode without receiver assistance. If the UE operates in the omni-directional LBT receiver assisted sub-mode and sends K consecutive RTR, then the gNB may indicate to the UE to switch to the omni-directional LBT sub-mode without receiver assistance.

Alternatively, the UE may autonomously select the LBT sub-mode. The UE may autonomously switch to the omni-directional and directional LBT sub-mode from receiver assisted LBT sub-mode, and vice versa. For example, if the UE operates in the directional LBT receiver assisted sub-mode and detects K consecutive no-hidden node statuses, then the UE may autonomously switch to the directional LBT sub-mode without receiver assistance. A (pre-) configured threshold may be used to detect the no-hidden node status. If the measurement is below a (pre-) configured threshold, then a no-hidden node status may be declared. Otherwise a hidden node may be declared. If the UE operates in an omni-directional LBT receiver assisted sub-mode and detects K consecutive no-hidden node statuses, then the UE may autonomously switch to the omni-directional LBT sub-mode without receiver assistance. The value of K may be predefined or preconfigured. The value of K may be configured, e.g., by RRC signaling. The UE may indicate its decision to the gNB, e.g., via an uplink signal or channel. Detailed signaling is described below. Detection of K consecutive no-hidden node statuses may be K consecutive detection of no-hidden node for the same UE, or K different nodes, or the like, or a combination thereof.

The UE may suggest to the gNB to switch to the LBT sub-mode without receiver assistance. If the UE operates in an omni-directional LBT receiver assisted sub-mode and detects K consecutive no-hidden node statuses, then the UE may suggest to the gNB to switch to the omni-directional or directional LBT sub-mode without receiver assistance. If the UE operates in the directional LBT receiver assisted sub-mode and detects K consecutive no-hidden node statuses, then the UE may suggest to the gNB to switch to the directional or omni-directional LBT sub-mode without receiver assistance. The gNB may confirm the LBT sub-mode that the UE suggests by sending a confirmation signaling to the UE. The gNB may override the UE suggested LBT sub-mode and indicate another LBT sub-mode to the UE in a DL signaling. LBT sub-mode confirmations and indications are shown in table below. The gNB may send a separate signaling for confirmation, e.g., a 1-bit indicator for confirmation. For example, "0" may be used for confirmation and "1" may be used for no confirmation as shown in Table 1 below.

TABLE 1

LBT sub-modes confirmation/indication

| LBT sub-modes | Bits |
| --- | --- |
| Confirmation | 0 |
| No confirmation | 1 |

Alternatively, the gNB may use a code-point for confirmation, e.g., as shown in Table 2 below.

TABLE 2

LBT sub-modes confirmation/indication

| LBT sub-modes | Bits |
| --- | --- |
| Confirmation | 00 |
| Sub-mode 1 | 01 |
| Sub-mode 2 | 10 |
| Sub-mode 3 | 11 |

K consecutive no-hidden node instances may be changed to the criteria such as K no-hidden node instances in the last N LBT instance and N>K. K consecutive no-hidden node instances may also be changed to the criteria such as K ACKs in the last N detection instances and N>K. Depending on the ratio of K/N, LBT sub-mode switching may be triggered or not. For example, if the ratio is greater than or equal to a predefined or (pre-) configured threshold, then it may trigger the switching to the no-receiver assisted LBT. If the ratio is less than a predefined or (pre-) configured threshold, then it may trigger the switching to the receiver assisted LBT.

Timer-based approaches may also be used. For example, if a timer expires and no-hidden node is detected, then it may switch to no-receiver assisted LBT. If the no-hidden node is detected before a timer expires, then it may switch to the receiver assisted LBT, or the like. Timer-based approaches may be used and incorporated into various solutions throughout the application including the solutions described herein.

The gNB may determine the LBT sub-mode and indicate the decision to the UE. If the UE operates in the omni-directional LBT without the receiver assisted sub-mode and sends K consecutive NACKs, then the gNB may indicate to the UE to switch to the omni-directional LBT sub-mode with receiver assistance. If the UE operates in the directional LBT without the receiver assisted sub-mode and sends K consecutive NACKs, then the gNB may indicate to the UE to switch to the directional LBT sub-mode with receiver assistance.

The UE may autonomously choose the LBT sub-mode and indicate the decision to the gNB. If the UE operates in the omni-directional LBT without receiver assisted sub-mode and generates K consecutive NACKs, then the UE may autonomously switch to the omni-directional LBT sub-mode with receiver assistance and indicate the receiver assistance decision to the gNB. If the UE operates in the directional LBT without receiver assisted sub-mode and generates K consecutive NACKs, then the UE may switch to directional LBT sub-mode with receiver assistance and indicate the receiver assistance decision to the gNB.

Alternatively, the UE may provide assistance information or not provide assistance information to the gNB, without explicitly indicating that a LBT sub-mode is switched.

The UE may suggest to the gNB to switch to the LBT sub-mode with receiver assistance. If the UE operates in the omni-directional LBT without receiver assisted sub-mode and detects K consecutive NACKs, then the UE may suggest to the gNB to switch to the omni-directional LBT sub-mode with receiver assistance. If the UE operates in the directional LBT without receiver assisted sub-mode and detects K consecutive NACKs, then the UE may suggest to the gNB to switch to the directional LBT sub-mode with receiver assistance. The gNB may confirm the LBT sub-mode that the UE suggests. The gNB may confirm the LBT sub-mode that the UE suggests by sending confirmation signaling to the UE. The gNB may override the UE suggested LBT sub-mode and indicate another LBT sub-mode to the UE in a DL signaling.

K consecutive NACKs criteria may be changed to criteria such that at least K NACKs generated or received in the past N instances and N>K. Depending on the ratio of K/N, LBT sub-mode switching may be triggered or not. For example, if the ratio is greater than or equal to a predefined or (pre-) configured threshold, then it may trigger the switching to receiver assisted LBT. If the ratio is less than a predefined or (pre-) configured threshold, then it may trigger to the switching to no-receiver assisted LBT.

FIG. 1 shows an example method for LBT sub-mode switching with receiver assisted LBT sub-mode as the initial state 151. The gNB may send the PDCCH (step 152). The UE may send the RTR (step 153). The gNB may determine whether there are K consecutive RTRs received (step 154). If there are K consecutive RTRs received, the gNB may determine to switch the LBT sub-mode to receiver assistance (step 157) and may indicate to the UE for LBT sub-mode switching. If there are not K consecutive RTRs received, the gNB may determine to switch the LBT sub-mode to no receiver assistance (step 155) and may indicate to the UE for LBT sub-mode switching. If K consecutive NACKs are received (step 156), the gNB may continue selecting no receiver assistance at step 155 or switch to receiver assistance. If K consecutive RTRs are received (step 158), the gNB may switch to no receiver assistance or continue selecting receiver assistance.

Figure 2:
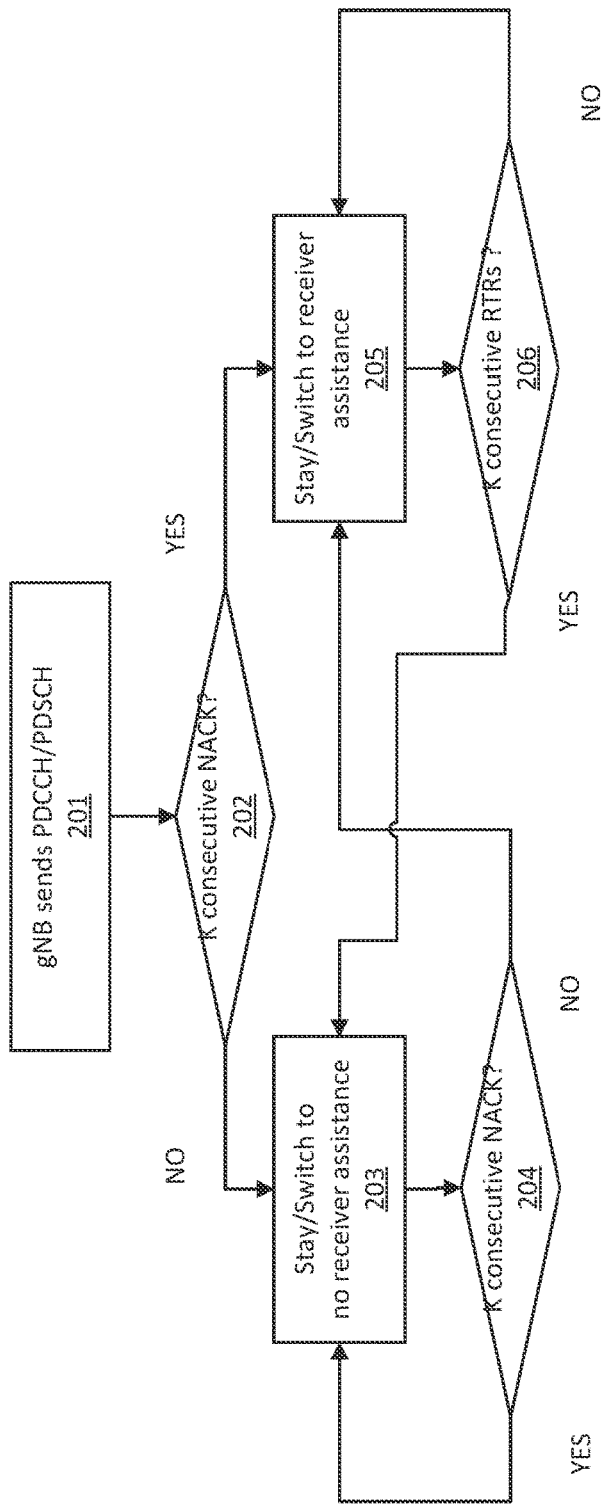
FIG. 2 shows a mechanism of LBT sub-mode switching with no receiver assisted LBT sub-mode as initial state.

FIG. 2 shows an example method for LBT sub-mode switching with no receiver assisted LBT sub-mode 200. The gNB may send the PDCCH/PDSCH (step 201). The gNB may determine whether there are K consecutive NACKs received (step 202). If there are K consecutive NACKs received, the gNB may determine to switch the LBT sub-mode to receiver assistance (step 205) and may indicate to the UE for LBT sub-mode switching. If there are not K consecutive NACKs received, the gNB may determine to switch the LBT sub-mode to no receiver assistance (step 203) and may indicate to the UE for LBT sub-mode switching. If K consecutive NACKs are received following step 203 (step 204), the gNB may continue selecting no receiver assistance, or the gNB may switch to receiver assistance. If K consecutive RTRs are received following step 205 (step 206), the gNB may switch to no receiver assistance, or the gNB may continue selecting receiver assistance.

The gNB may perform LBT and switch LBT sub-mode based on the predefined or (pre-) configured criteria. The gNB may indicate the determined LBT sub-mode to the UE. The UE may perform LBT and switch LBT sub-mode based on the predefined or (pre-) configured criteria. The UE may indicate the determined LBT sub-mode to the gNB.

Figure 3:
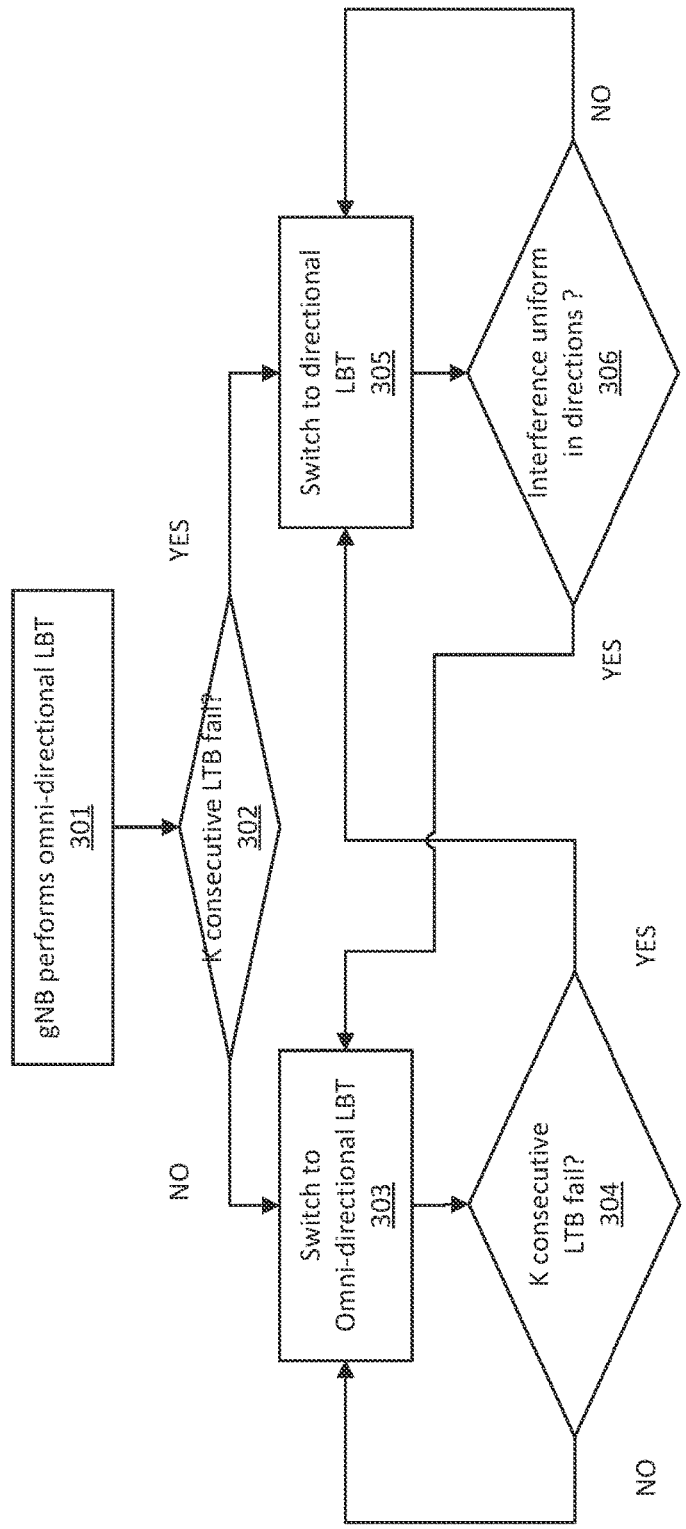
FIG. 3 shows a mechanism of LBT sub-mode switching for omni-directional and directional LBT.

FIG. 3 shows an example method for LBT sub-mode switching for omni-directional and directional LBT 300. The gNB may determine the LBT sub-mode based on an interference profile. The gNB may perform omni-directional LBT (step 301). If the omni-directional LBT succeeds (step 302), then the gNB may continue selecting the omni-directional LBT (step 303). If omni-directional LBT fails K3 consecutive times, the gNB may switch to the directional LBT (step 305). If K consecutive LTBs fail following step 303 (step 304), the gNB may switch to the directional LBT at step 305, or the gNB may repeat step 303. If interference is uniform in all directions following step 305 (step 306), the gNB may switch to the omni-directional LBT at step 303, or the gNB may continue selecting the directional LBT.

For example, if the gNB fails a directional beam, the gNB may adjust the beamwidth and the corresponding threshold for the directional LBT. In another example, if the directional LBT succeeds for all beams for K4 consecutive times, then the gNB may switch to the omni-directional LBT. When transmitting, e.g., the UE may use omni-directional to sense the channel, and it may use threshold x, e.g., an energy detection threshold or the like. If there is interference, then the transmitter of the UE may switch to directional LBT and may use threshold y. The transmitter can build up an active UE/WiFi beam direction profile. Similarly, the receiver may use omni to sense the channel and may use threshold w. If there is interference, then receiver may switch to directional LBT and may use threshold z. The receiver can build up an active UE/WiFi beam direction profile.

Furthermore, if different beamwidths are used for the transmitter, then multiple thresholds may be used for TX LBT. For example, if antenna gain and/or beamforming gain is Q dB, then the updated threshold may be (T+Q) dB where T may be the initial threshold before beamwidth adjustment. There could be multiple thresholds and corresponding multiple values of Qs. For example, for a wide beam, Q1 may be used. For medium beamwidth, Q2 may be used. For narrow beam, Q3 may be used, and so on.

Omni-directional LBT has lower overhead but does not enable spatial reuse. Directional LBT can enable spatial reuse but has higher overhead. Since LBT may be performed multiple times either in sequential or in parallel which may increase overhead. Switching between omni-directional and directional LBT could optimize system performance.

K3 consecutive times failure may be changed to the criteria such that K3 failures in last N3 instances and N3>K3. Depending on the ratio of K3/N3, LBT sub-mode switching may be triggered or not. For example, if the ratio is greater than or equal to a predefined or (pre-) configured threshold, then it may trigger to the switching to directional LBT. If the ratio is less than a predefined or (pre-) configured threshold, then it may trigger to the switching to omni-directional LBT, or the like.

Figure 4:
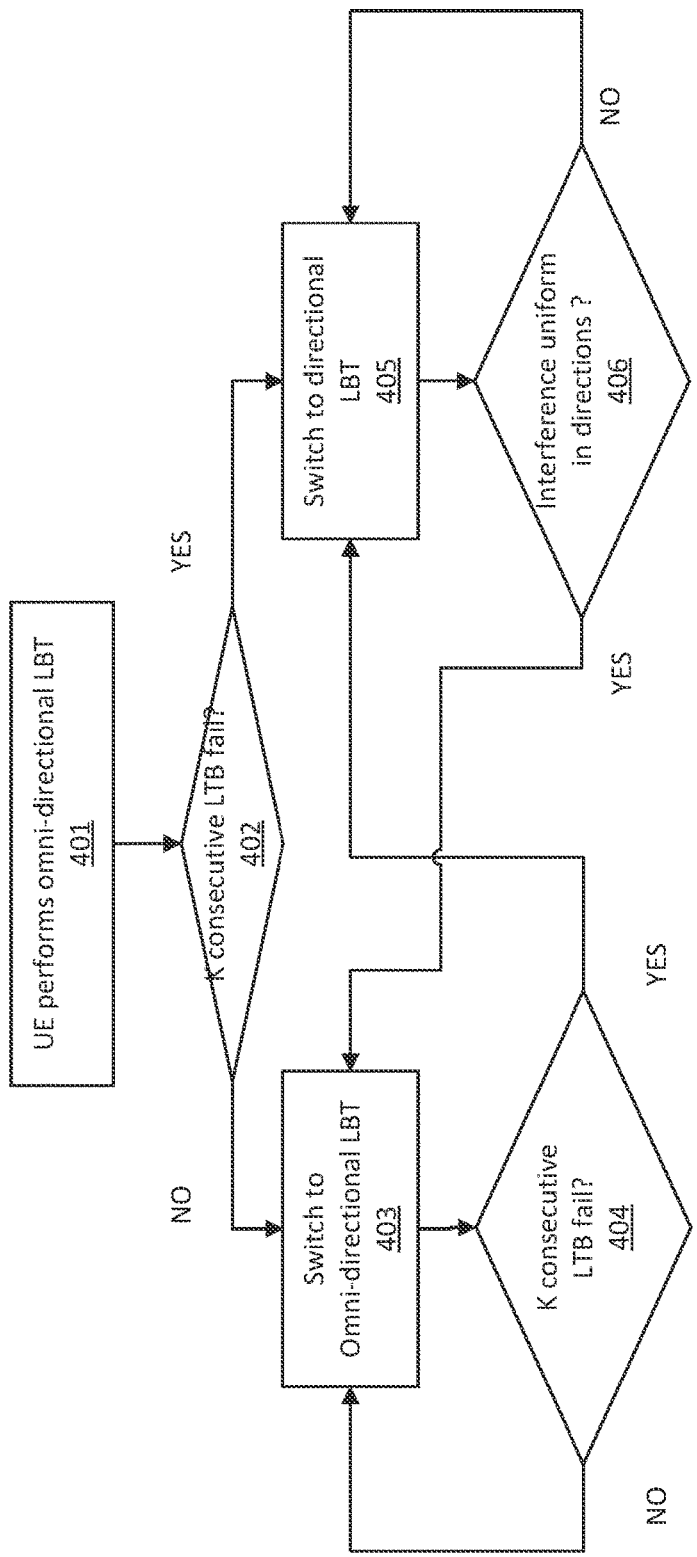
FIG. 4 shows a mechanism of LBT sub-mode switching for omni-directional and directional LBT.

FIG. 4 shows an example method for LBT sub-mode switching for omni-directional and directional LBT 400. The UE may perform omni-directional LBT (step 401). If the omni-directional LBT succeeds (step 402), then the UE may continue selecting the omni-directional LBT (step 403). If omni-directional LBT fails K3 consecutive times, the UE may switch to the directional LBT (step 405). If K consecutive LTBs fail following step 403 (step 404), the UE may switch to the directional LBT at step 405, or the UE may repeat step 403. If interference is uniform in all directions following step 405 (step 406), the UE may switch to the omni-directional LBT at step 403, or the UE may continue selecting the directional LBT.

Table 3 below shows the LBT sub-modes and receiver assistance types. The hand-shake may involve with two way signaling. Without hand-shake may involve one way signaling or no signaling.

TABLE 3

LBT sub-modes and receiver assistance types

| LBT sub-modes | Type | Bits |
| --- | --- | --- |
| Omni-directional | Without hand-shake receiver assistance | 00 |
| Directional | Without hand-shake receiver assistance | 01 |
| Receiver assistance | With hand-shake receiver assistance | 10 |
| Reserved | N/A | 11 |

In an example, interference may be dynamic or semi-static. This could be estimated or measured. In addition, long-term and/or short-term sensing or measurements may be performed. Based on sensing and/or measurement results, the dynamic or semi-static status may be determined. If the dynamic status for interference is determined, then a DCI-based approach or MAC-based approach may be used. If the semi-static status for interferences is determined, then a MAC-based and/or RRC-based approach may be used. For another example, if DCI-based approach is used, then the dynamic status for interference may be determined. Otherwise, the semi-static or static status for interference may be determined.

K bits may be used. For example, K=2 bits may be used to indicate up to four sub-modes. Alternatively, up to four codepoints in DCI may be used to indicate up to four sub-modes.

For DCI-based approach, DCI including GC-DCI may be used to indicate the LBT sub-mode. For example, a DCI format 2_0 may be used or a new DCI format e.g., DCI format 2_x may be introduced. Location of the control field, the presence and absence of the control field and/or the size of control field, e.g., number of bits, in DCI format may be configurable e.g., via RRC signaling. Alternatively, such control field may be activated or deactivated by another signaling, e.g., via MAC CE.

For MAC-based approach, MAC or MAC CE may be used to indicate the LBT sub-mode.

For RRC-based approach, RRC signaling and information element (IE) may be used to indicate the LBT sub-mode.

To reduce signaling overhead, LBT sub-modes may be partitioned into two or more groups. For example, omni-directional LBT could have additional two sub-modes, namely, omni-directional LBT with receiver assistance and omni-directional LBT without receiver assistance. Similarly, directional LBT could have additional two sub-modes, namely, directional LBT with receiver assistance and directional LBT without receiver assistance.

Table 4 shows another arrangement for LBT sub-modes and receiver assistance types.

TABLE 4

LBT sub-modes and receiver assistance types

| LBT sub-modes | Type | Bits |
| --- | --- | --- |
| Omni-directional | With receiver assistance | 00 |
| Omni-directional | Without receiver assistance | 01 |
| Directional LBT | With receiver assistance | 10 |
| Directional LBT | Without receiver assistance | 11 |

An example for LBT sub-modes and signaling types is depicted in Table 5 below. MAC may indicate which type is used, e.g., omni-directional or directional LBT is used. DCI may indicate whether receiver assisted LBT is used or not. Less bits are required in PHY. For example, only 1 bit is required in PDCCH or DCI. MAC may use MSB bit and PHY may use LSB bit.

TABLE 5

LBT sub-modes and signaling types

| LBT sub-modes | Signalling Type | Bits |
| --- | --- | --- |
| Omni-directional | MAC | MSB "0" |
| Directional LBT | MAC | MSB "1" |
| With receiver assistance | DCI | LSB "0" |
| Without receiver assistance | DCI | LSB "1" |

Another example of LBT sub-modes and signaling types is depicted in Table 6 below. Less bits are required in PHY. For example, only 1 bit is required in PDCCH or DCI.

TABLE 6

LBT sub-modes and signaling types

| LBT sub-modes | Signalling Type | Bits |
| --- | --- | --- |
| LBT sub-mode group 1 | RRC | Primary MSB "0" |
| LBT sub-mode group 2 | RRC | Primary MSB "1" |
| LBT sub-mode subset 1 within LBT mode group | MAC CE | Secondary MSB "0" |
| LBT sub-mode subset 2 within LBT mode group | MAC CE | Secondary MSB "1" |
| LBT sub-mode 1 within LBT group | DCI | LSB "0" |
| LBT sub-mode 2 within LBT group | DCI | LSB "1" |

For interference measurement reporting and/or hidden node status reporting, PRACH-based approach and/or PUCCH-based approach may be used.

For example, PRACH partitioning may be used and each partitioning may be used to indicate one of hidden node status. PRACH partitioning may be PRACH sequence partitioning, PRACH time resource partitioning, PRACH frequency resource partitioning, PRACH time/frequency resource partitioning, combination of them or the like.

An example for PRACH partitioning scheme is depicted in Table 7 below.

TABLE 7

Hidden node report by PRACH partition

| PRACH Partitioning | Indication | Bits |
| --- | --- | --- |
| PRACH partitioning 1 | Hidden Node Presence | 0 |
| PRACH partitioning 2 | Hidden Node Absence | 1 |

An example for PUCCH partitioning scheme is depicted in Table 8 below. PUCCH sequences, cyclic shifts and/or time/frequency resources or combination of them may be partitioned for indication of hidden node status, e.g., present or absent.

TABLE 8

Hidden node report by PUCCH partition

| PUCCH partitioning | Indication | Bits |
| --- | --- | --- |
| PUCCH partitioning 1 | Hidden Node Presence | 0 |
| PUCCH partitioning 2 | Hidden Node Absence | 1 |

UCI may be used to carry such indication. An example for PUCCH payload scheme is depicted in Table 9 below.

TABLE 9

Hidden node report by PUCCH payload

| PUCCH payload | Indication | Bits |
| --- | --- | --- |
| Bit "0" | Hidden Node Presence | 0 |
| Bit "1" | Hidden Node Absence | 1 |

An example for PRACH partitioning scheme is depicted in Table 10 below.

TABLE 10

Hidden node report by PRACH partitioning

| PRACH Partitioning | Indication | Bits |
| --- | --- | --- |
| PRACH partitioning 1 | Hidden Node Presence - Severe | 00 |
| PRACH partitioning 2 | Hidden Node Presence - Moderate | 01 |
| PRACH partitioning 3 | Hidden Node Absence - Light | 10 |
| PRACH partitioning 4 | Hidden Node Absence | 11 |

An example for Hidden node hybrid report scheme by PRACH and PUCCH is depicted in Table 11 below. PUCCH #x and PUCCH #y may be index to a PUCCH partitioning or included in PUCCH payload.

TABLE 11

Hidden node hybrid report scheme by PRACH and PUCCH

| PRACH Partitioning | Indication | Bits |
| --- | --- | --- |
| PRACH partitioning x | Hidden Node Presence - Severe | 00 |
| PRACH partitioning y | Hidden Node Presence - Moderate | 01 |
| PUCCH# x | Hidden Node Absence - Light | 10 |
| PUCCH# y | Hidden Node Absence | 11 |

Hidden node info on UCI may piggyback on PUSCH.

Another example for hybrid PUCCH partitioning and PUCCH payload scheme is depicted in Table 12 below.

TABLE 12

Hidden node report by PUCCH Hybrid scheme

| PRACH Partitioning | PUCCH payload | Indication | Bits |
|---|---|---|---|
| PUCCH partitioning 1 | "0" | Hidden Node Presence - Severe | 00 |
|  | "1" | Hidden Node Presence - Moderate | 01 |
| PUCCH partitioning 2 | "0" | Hidden Node Absence - Light | 10 |
|  | "1" | Hidden Node Absence | 11 |

Another example for 2-step RACH for DMRS port partitioning scheme is depicted in Table 13 below.

The UE may also transmit MAC CE or UCI on MsgA-PUSCH to indicate the information needed.

TABLE 13

Hidden node report by DMRS port partitioning scheme for 2-step RACH scheme

| DMRS Port Partitioning | Indication | Bits |
|---|---|---|
| DMRS Port partitioning 1 | Hidden Node Presence - Severe | 00 |
| DMRS Port partitioning 2 | Hidden Node Presence - Moderate | 01 |
| DMRS Port partitioning 3 | Hidden Node Absence - Light | 10 |
| DMRS Port partitioning 4 | Hidden Node Absence | 11 |

Another example for 2-step RACH for DMRS sequence partitioning scheme for 2-step RACH is depicted in Table 14 below.

TABLE 14

Hidden node report by DMRS sequence partitioning scheme for 2-step RACH

| DMRS Sequence Partitioning | Indication | Bits |
|---|---|---|
| DMRS Sequence partitioning 1 | Hidden Node Presence - Severe | 00 |
| DMRS Sequence partitioning 2 | Hidden Node Presence - Moderate | 01 |
| DMRS Sequence partitioning 3 | Hidden Node Absence - Light | 10 |
| DMRS Sequence partitioning 4 | Hidden Node Absence | 11 |

Another example for Hidden node report by DMRS port/sequence scheme for 2-step RACH is depicted in Table 15 below.

TABLE 15

Hidden node report by DMRS port/sequence scheme for 2-step RACH

| DMRS Port/Sequence Partitioning | Indication | Bits |
|---|---|---|
| DMRS Port/Sequence partitioning 1 | Hidden Node Presence - Severe | 00 |
| DMRS Port/Sequence partitioning 2 | Hidden Node Presence - Moderate | 01 |
| DMRS Port/Sequence partitioning 3 | Hidden Node Absence - Light | 10 |
| DMRS Port/Sequence partitioning 4 | Hidden Node Absence | 11 |

Another example for Hidden node report by MsgA PRACH and PUSCH scheme for 2-step RACH is depicted in Table 16 below.

TABLE 16

Hidden node report by MsgA PRACH and PUSCH scheme for 2-step RACH

| MsgA PRACH Partitioning | MsgA PUSCH payload | Indication | Bits |
|---|---|---|---|
| MsgA PRACH partitioning 1 | "0" | Hidden Node Presence - Severe | 00 |
|  | "1" | Hidden Node Presence - Moderate | 01 |
| MsgA PRACH partitioning 2 | "0" | Hidden Node Absence - Light | 10 |
|  | "1" | Hidden Node Absence | 11 |

MAC CE or UCI may be carried in MsgA-PUSCH and the indication field e.g., 1-bit field may be carried in UCI or MAC CE.

Yet another example for Hidden node report by MsgA DMRS port and PUSCH scheme for 2-step RACH is depicted in Table 17 below.

TABLE 17

Hidden node report by MsgA DMRS port and PUSCH scheme for 2-step RACH

| MsgA DMRS Port Partitioning | MsgA PUSCH payload | Indication | Bits |
|---|---|---|---|
| MsgA DMRS partitioning 1 | "0" | Hidden Node Presence-Severe | 00 |
|  | "1" | Hidden Node Presence-Moderate | 01 |
| MsgA DMRS partitioning 2 | "0" | Hidden Node Absence-Light | 10 |
|  | "1" | Hidden Node Absence | 11 |

Methods to indicate interference level are proposed.

Interference status report by PRACH partitioning scheme is depicted in Table 18.

TABLE 18

Interference status report by PRACH partitioning scheme

| PRACH Partitioning | Indication | Threshold | Bits |
|---|---|---|---|
| PRACH partitioning 1 | Interference-Severe | T2 < I < T3 | 00 |
| PRACH partitioning 2 | Interference-Moderate | T1 < I < T2 | 01 |
| PRACH partitioning 3 | Interference-Light | T0 < I < T1 | 10 |
| PRACH partitioning 4 | Interference Absence | I < T0 | 11 |

Interference status report by PUCCH partitioning scheme is shown in Table 19.

TABLE 19

Interference status report by PUCCH partitioning scheme

| PUCCH Partitioning | Indication | Threshold | Bits |
|---|---|---|---|
| PUCCH partitioning 1 | Interference-Severe | T2 < I < T3 | 00 |
| PUCCH partitioning 2 | Interference-Moderate | T1 < I < T2 | 01 |
| PUCCH partitioning 3 | Interference-Light | T0 < I < T1 | 10 |
| PUCCH partitioning 4 | Interference Absence | I < T0 | 11 |

Methods to indicate whether it is due to fading or hidden node.

An example for channel fading and hidden node status report by PRACH partitioning scheme is shown in Table 20 below.

TABLE 20

Fading and hidden node status report by PRACH partitioning scheme

| PRACH Partitioning | Indication | Bits |
|---|---|---|
| PRACH partitioning 1 | Fading | 0 |
| PRACH partitioning 2 | Hidden Node | 1 |

An example for channel fading and hidden node status report by PUCCH partitioning scheme is depicted in Table 21 below.

TABLE 21

Fading and hidden node status report by PUCCH partitioning scheme

| PUCCH partitioning | Indication | Bits |
|---|---|---|
| PUCCH partitioning 1 | Fading | 0 |
| PUCCH partitioning 2 | Hidden Node | 1 |

An example for channel fading and hidden node status report by PRACH/PUCCH hybrid scheme is depicted in Table 22 below.

TABLE 22

Fading and hidden node status report by PRACH/PUCCH hybrid scheme

| PRACH Partitioning | Indication | Interference | Bits |
|---|---|---|---|
| PRACH/PUCCH partitioning 1 | Fading | I < T | 0 |
| PRACH/PUCCH partitioning 2 | Hidden Node | I > T | 1 |

Another example for hybrid PRACH/PUCCH scheme is depicted in Table 23 below.

TABLE 23

Fading and hidden node status report by PRACH/PUCCH hybrid scheme

| PRACH Partitioning | Indication | Interference | Bits |
|---|---|---|---|
| PRACH | Fading | I < T | 0 |
| PUCCH | Hidden Node | I > T | 1 |

Sounding reference signal (SRS) partitioning, e.g., sequence partitioning, port partition, time/freq resource partitioning or combination of them or the like may also be used. SRS may also be used in combination with previous methods including PRACH-based, PUCCH-based, and so on.

Enhancements for resource under-utilization and interference handling are described herein. Exposed node could cause resource under-utilization. This is because when transmitter fails LBT while receiver succeeds LBT, transmitter may still be able to make transmission to receiver, as long as the transmitter does not cause additional interference to other receivers. This may increase resource utilization. However, in current system, when transmitter fails LBT, transmitter is not allowed to make transmission. To enhance the system performance and improve resource utilization efficiency, exposed node issue should be handled. To optimize the system, reduce the interference and signaling overhead as well as to enhance resource utilization, exposed node issues should be considered in combination with hidden node issue. Both NW control and/or UE autonomous aspects should be considered.

Figure 5:
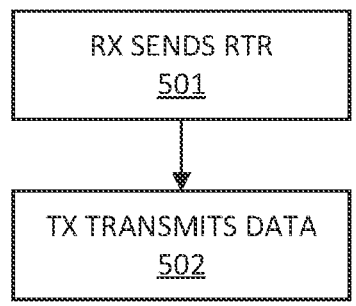
FIG. 5 shows a Scheme to handle exposed nodes.

FIG. 5 shows an example scheme for handling exposed nodes 500. In this example, a receiver may send an RTR (step 501). A transmitter may transmit data (step 502). Periodic RTR reporting may be used. Such scheme may not need handshaking signaling between transmitter and receiver. This scheme may also be used to cope with hidden node issue. Receiver may send RTR with or without Ready to Transmit (RTT). In addition, transmitter may not need to perform LBT to send RTT.

RTR reporting may be performed in a periodic manner. RTR reporting may also be triggered based on certain rule(s), condition(s) and/or criteria. Alternatively, RTR reporting may be triggered based on the reception of request signaling.

A RTR request may be included in a DCI format. Alternatively, CSI request control field may be reused for RTR request. For example, CSI/RTR control field may be configured e.g., by RRC. If CSI/RTR is configured to support CSI request, then the UE should interpret this control field in DCI format to be CSI request. If CSI/RTR is configured to support RTR request, then the UE should interpret the CSI/RTR control field in DCI format to be RTR request.

A flag may be included in DCI format. The flag may provide indication which (i.e., CSI or RTR) should be interpreted and therefore should be used. A flag or indicator may be included in the UE-specific DCI format (e.g., carried in PDCCH) and/or group common DCI format (e.g., carried in GC-PDCCH).

The number of bits or bit length for RTR field may be configurable. Depending on RTR report there may be as small as one bit or as large as N bits. RTR may contain just a request signal which may require a single bit. RTR reporting may also include other information such as request reporting of interference status, hidden node status, and so on. If configured, depending on what type and/or how many additional information are requested, the length of CSI/RTR control field may vary, e.g., may increase or decrease.

One solution may be to use different CSI code-points. For example, one CSI codepoint, e.g. one CQI value, may be used to correspond to "not RTR". Other codepoints, e.g. all other CQI values may correspond to "RTR".

Figure 6:
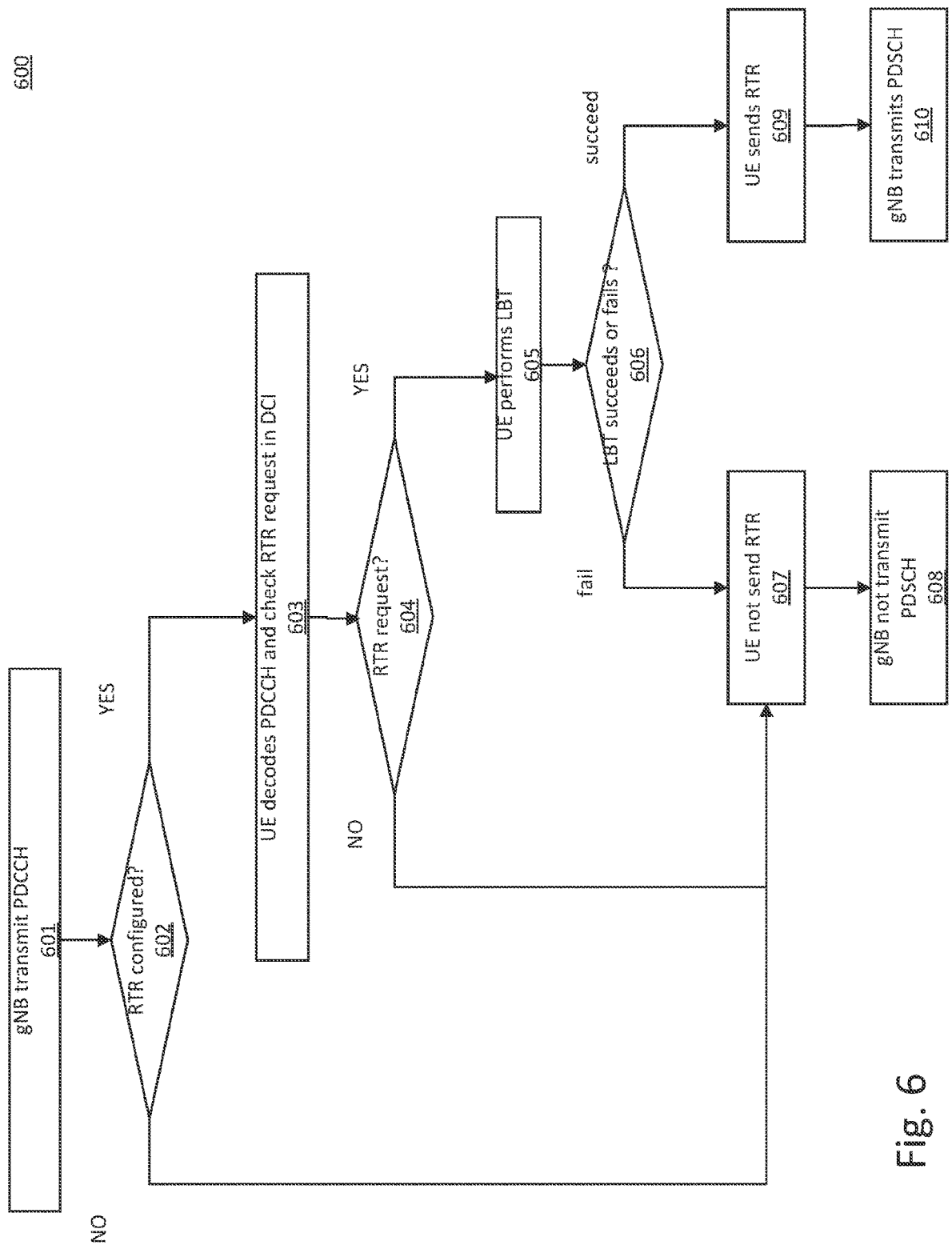
FIG. 6 shows a scheme of RTR request and reporting.

FIG. 6 shows an example scheme for RTR requesting and reporting 600. At step 601, the gNB may transmit the PDCCH. At step 602, the gNB may determine whether RTR is configured. If RTR is not configured (step 602), the UE may not send the RTR (step 607) and the gNB may not transmit the PDSCH (step 608).

If RTR is configured (step 602), the UE may decode the PDCCH and check the RTR request in the DCI (step 603). If there is not an RTR request (step 604), the UE may not send the RTR (step 607) and the gNB may not transmit the PDSCH (step 608). If there is an RTR request (step 604), the UE may perform LBT (step 605). If the LBT fails (step 606), the UE may not send the RTR (step 607) and the gNB may not transmit the PDSCH (step 608). If the LBT succeeds (step 606), the UE may send the RTR (step 609) and the gNB may transmit the PDSCH (step 610).

Alternatively, RTR reporting may be triggered based on certain rule(s), condition(s) and/or criteria. In high load for exposed node, an aperiodic scheme may be preferred. Overhead may be reduced because RTR is not sent periodically, or RTR reporting is not based on RTR request signaling.

In low load for exposed node, periodic RTR or RTR reporting may be based on RTR request signaling. However, periodic RTR may introduce additional overhead. Some trade-offs between performance and signaling overhead may be considered.

A hybrid scheme may be used. Whether to use periodic, explicit aperiodic RTR (e.g., based on rules and/or measurements), or implicit aperiodic RTR (based on explicit RTR request signaling) may be adaptive or configured. It may be UE autonomous or NW control.

The trigger may be based on some condition(s) and/or criteria e.g., load condition for exposed nodes. For example, in N time instances, if there are M time instances that exposed node(s) are detected, then the exposed node busy ratio may be defined as M/N.

Exposed node busy ratio (EBR)=$M/N$

If EBR is greater than or equal to a predefined or (pre-) configured threshold, then aperiodic RTR may be triggered.

Else if EBR is less than a predefined or (pre-) configured threshold, then periodic RTR may be triggered.

It may be triggered by the gNB. Aperiodic resource or the like may be indicated and used. It may be triggered by the UE. Periodic or semi-periodic resources or the like may be used.

There are four conditions for interference status.

Condition 1: If transmitter fails LBT and receiver succeeds LBT, then exposed node is detected. Transmission may be made.

Condition 2: If transmitter succeeds LBT and receiver fails LBT, then hidden node is detected. Transmission may not be made.

Condition 3: If both transmitter and receiver fail LBT, then transmission may not be made. It may be caused by either common interference node to TX/RX or both exposed/hidden node (i.e., exposed node to TX and hidden node to RX).

Condition 4: If both transmitter and receiver succeed LBT, then transmission may be made.

Figure 7:
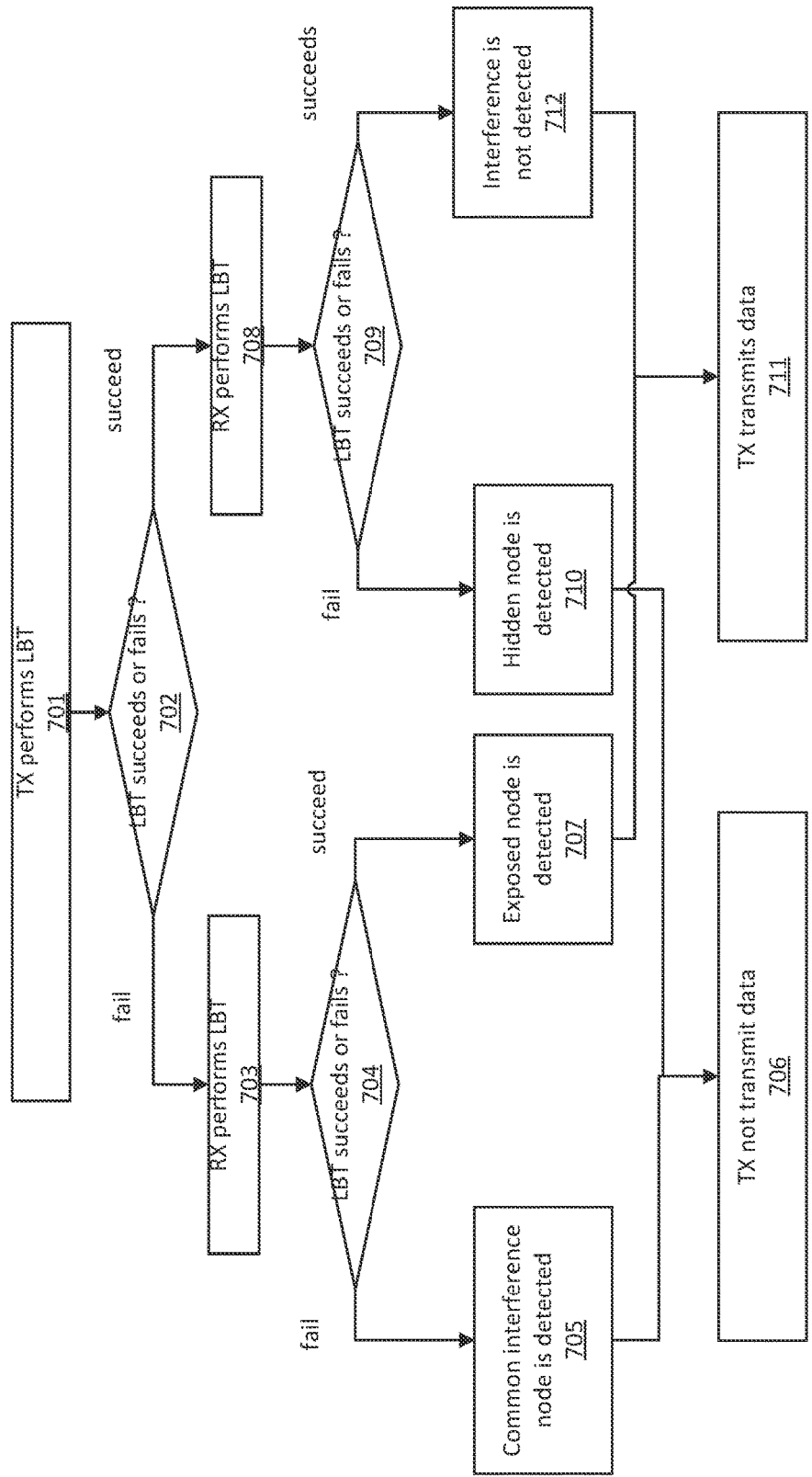
FIG. 7 shows a scheme to handle interferences.

FIG. 7 shows an example method to handle interference based on these four conditions 700. The transmitter may perform LBT (step 701). If LBT fails (step 702), the receiver may perform LBT (step 703). If LBT succeeds (step 704), an exposed node may be detected (step 707), and the transmitter may transmit data (step 711). If LBT fails (step 704), a common interference node may be detected (step 705), and the transmitter may not transmit data (step 706).

If LBT succeeds (step 702), the receiver may perform LBT (step 708). If LBT succeeds (step 709), interference may not be detected (step 712), and the transmitter may transmit data (step 711). If LBT fails (step 709), a hidden node may be detected (step 710), and the transmitter may not transmit data (step 706).

The transmitter may indicate LBT results to receiver. In combination of receiver's LBT results, one of the conditions may be identified. Transmitter may request additional information for interference status. When requested, the receiver may report RTR with interference status together with its LBT result. For example, 2 bits may be used in RTR reporting to indicate one of the four conditions for interference status. If additional interference status may be requested, more than two bits may be needed, and a larger payload may be required.

Aperiodic RTR may be used in combination with condition-based aperiodic RTR and/or periodic RTR reporting. Aperiodic RTR reporting may be carried in the PUSCH or PUCCH. Aperiodic RTR reporting may also be carried in a scheduling request (SR). For example, some SR resources may be reserved or reused for RTR reporting. Periodic RTR may be carried in PUCCH or PRACH. Periodic RTR reporting may also be carried in the SR or a sounding reference signal (SRS). Alternatively, aperiodic and/or periodic RTR reporting may be carried in a MAC CE.

A configured grant type approach may be used for RTR reporting. The resources may be configured or preconfigured by the gNB. Resources may be dedicated or shared among the UEs. PUSCH and/or PUCCH type configured grant may be used. In PUSCH type CG, resources are reserved for PUSCH transmission for RTR reporting. In PUCCH type CG, resources are reserved for PUCCH transmission for RTR reporting.

Both PUCCH partitioning and/or PUCCH payload may be used to carry RTR reporting. TX may perform LBT before transmission. When omni-directional LBT is performed and shows that channel is busy at transmitter, transmitter may switch to directional LBT and perform LBT in the direction for transmission. If directional LBT succeeds, then transmitter may send RTT. Receiver may send RTR signal. Transmitter may transmit data even if channel is busy using omni-directional LBT. In low load for exposed node, aperiodic scheme may be preferred.

Alternatively, RTT may be generated whenever TX has data to transmit regardless if channel is busy or not. When omni-directional LBT is performed and shows that channel is busy at transmitter, transmitter may switch to directional LBT and perform LBT in the direction for transmission. If directional LBT fails, then transmitter may still send RTT. Receiver may send RTR signal. Transmitter may transmit data even if channel is busy using directional LBT. Since typically when directional LBT is used, the likelihood that transmitter causes additional interference to other devices in the same direction is low, therefore, transmitter may still send RTT and expect RTR. RTT may not experience interference. RTR may experience some interference. Successful decoding of RTR may depend on interference level. Therefore, it may be beneficial for transmitter to send RTT with indication of interference level. If interference level is high, then RTR may not be sent. If interference level is low, RTR may be sent. A threshold may be used to judge the interference level. Threshold may be (pre-) configured and may be adaptive dependent on beamwidth and/or antenna gain, or the like.

Figure 8:
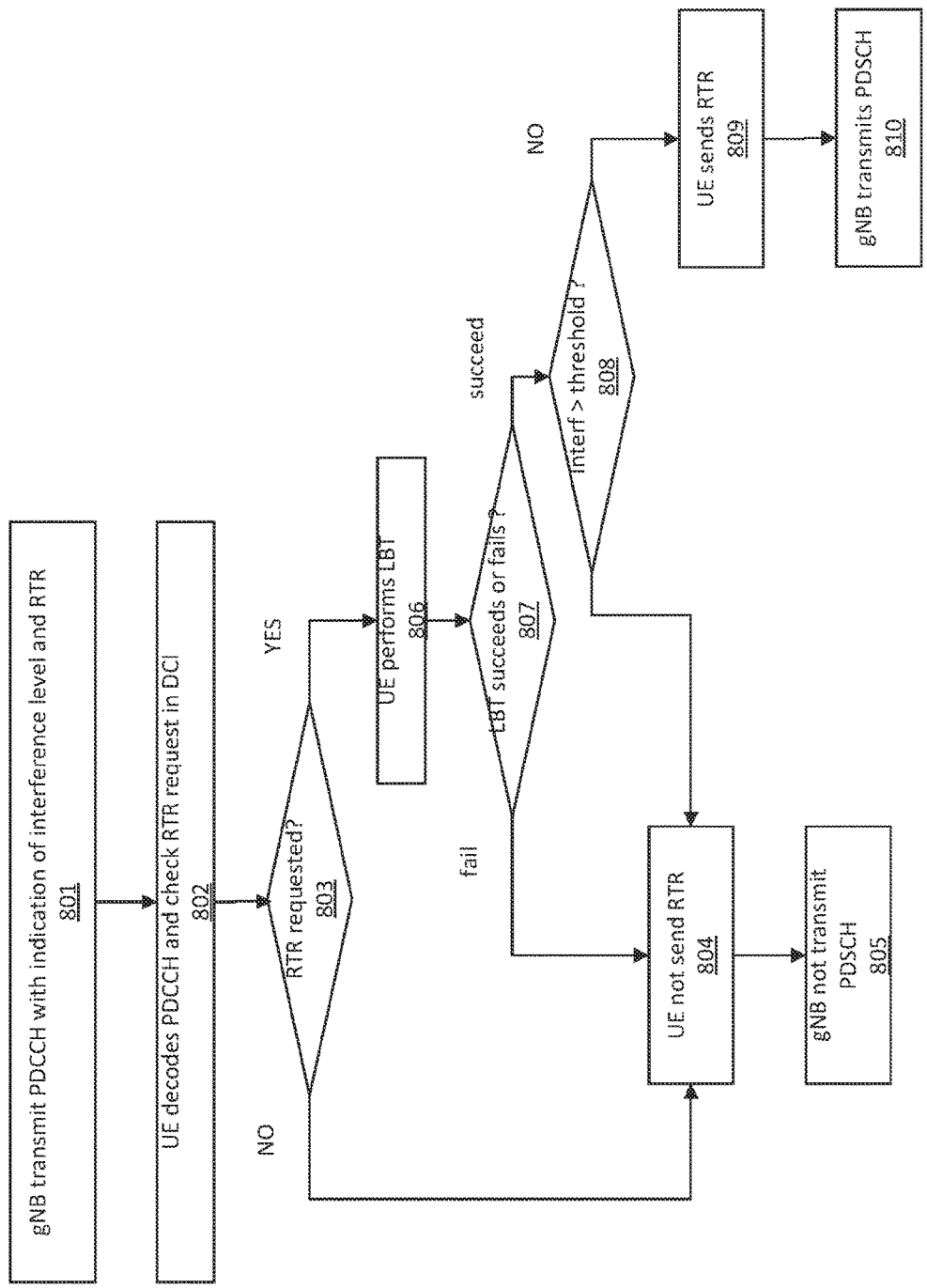
FIG. 8 shows interference dependent RTR scheme using indication of interference level in PDCCH.

FIG. 8 shows an example of an interference dependent RTR method using an indication of an interference level in the PDCCH 800. At step 801, the gNB may transmit the PDCCH with an indication of an interference level and RTR. At step 802, the UE may decode the PDCCH and may check the RTR request in the DCI. If RTR is not requested (step 803), the UE may not send the RTR (step 804) and the gNB may not transmit the PDSCH (step 805).

If RTR is requested (step 803), the UE may perform LBT (step 806). If the LBT fails (step 807), the UE may not send the RTR (step 804) and the gNB may not transmit the PDSCH (step 805). If the LBT succeeds (step 807), and interference is greater than a threshold (step 808), the UE may not send the RTR (step 804), and the gNB may not transmit the PDSCH (step 805). If the LBT fails (step 807), and interference is not greater than a threshold (step 808), the UE may send the RTR (step 809) and the gNB may transmit the PDSCH (step 810).

Figure 9:
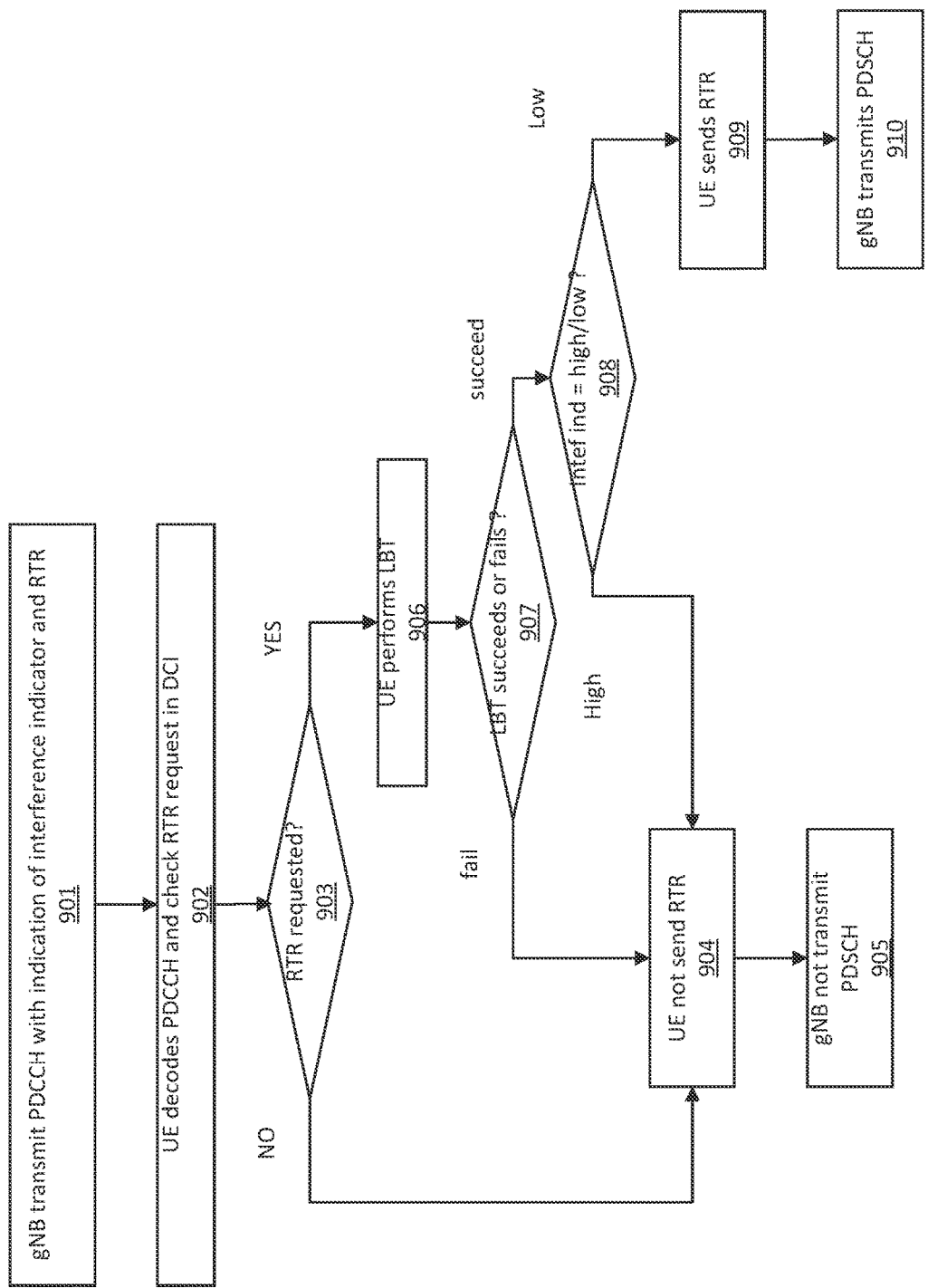
FIG. 9 shows interference dependent RTR scheme using interference indicator in PDCCH.

FIG. 9 shows interference dependent RTR scheme using interference indicator in PDCCH 900. At step 901, the gNB may transmit the PDCCH with an interference indicator and RTR. At step 902, the UE may decode the PDCCH and may check the RTR request in the DCI. If RTR is not requested (step 903), the UE may not send the RTR (step 904) and the gNB may not transmit the PDSCH (step 905).

If RTR is requested (step 903), the UE may perform LBT (step 906). If the LBT fails (step 907), the UE may not send the RTR (step 904) and the gNB may not transmit the PDSCH (step 905). If the LBT succeeds (step 907), and interference is indicated to be high (step 908), the UE may not send the RTR (step 904), and the gNB may not transmit the PDSCH (step 905). If the LBT fails (step 907), and interference is indicated to be low (step 908), the UE may send the RTR (step 909) and the gNB may transmit the PDSCH (step 910).

Figure 10:
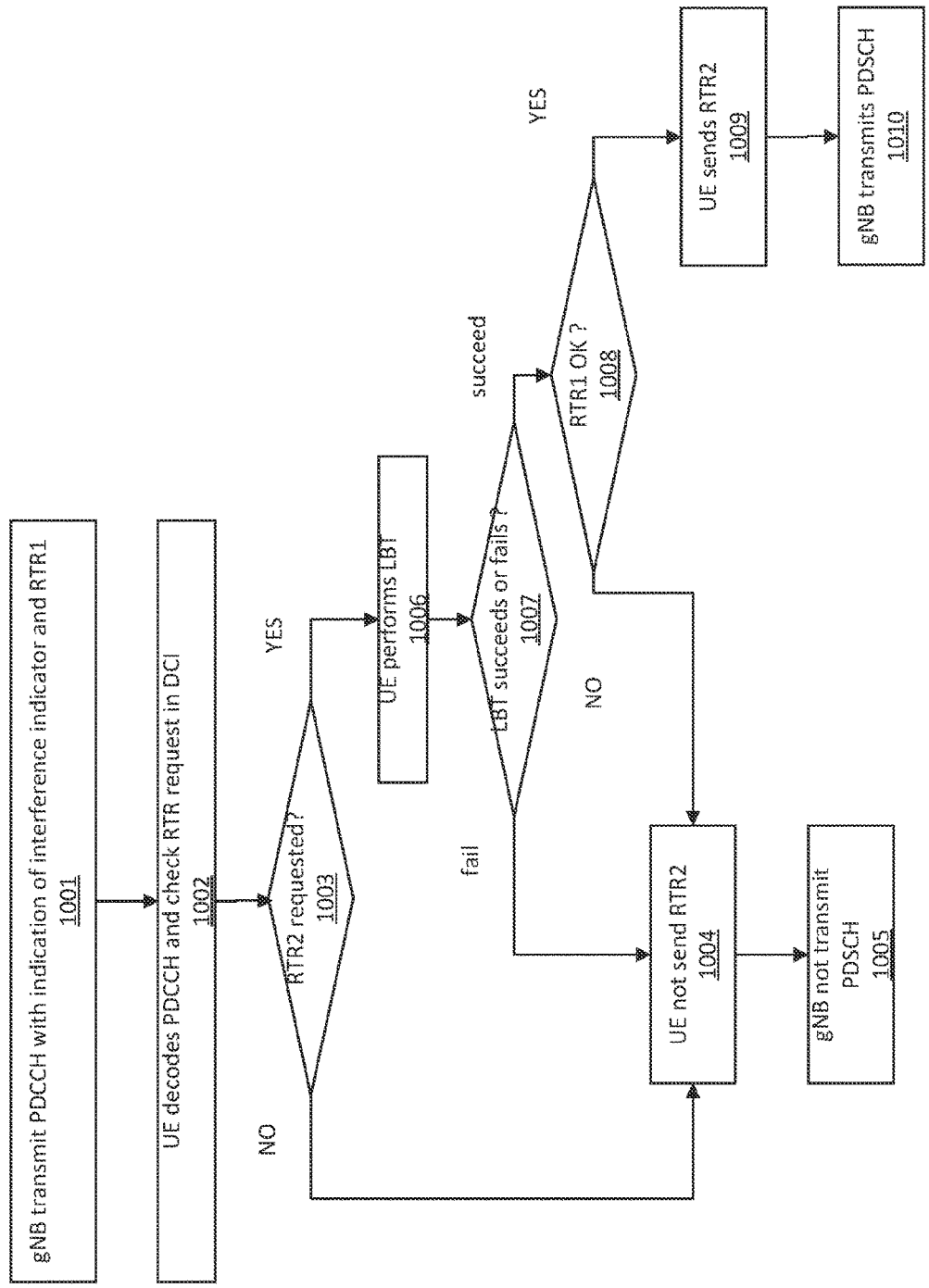
FIG. 10 shows an RTR scheme using dual RTR1/RTR2 indication.

FIG. 10 shows an RTR scheme using dual RTR1/RTR2 indication 1000. At step 1001, the gNB may transmit the PDCCH with an interference indicator and RTR1. At step 1002, the UE may decode the PDCCH and may check the RTR request in the DCI. If RTR2 is not requested (step 1003), the UE may not send the RTR2 (step 1004) and the gNB may not transmit the PDSCH (step 1005).

If RTR2 is requested (step 1003), the UE may perform LBT (step 1006). If the LBT fails (step 1007), the UE may not send the RTR2 (step 1004) and the gNB may not transmit the PDSCH (step 1005). If the LBT succeeds (step 1007), and RTR1 is not OK (step 1008), the UE may not send the RTR2 (step 1004), and the gNB may not transmit the PDSCH (step 1005). If the LBT fails (step 1007), and RTR1 is OK (step 1008), the UE may send the RTR (step 1009) and the gNB may transmit the PDSCH (step 1010).

For DL Assignment, the gNB may perform LBT before transmission. When interference is absent or moderate, the gNB may send PDCCH to the UE with indication of LBT results. Once the UE receives PDCCH, the UE may send RTR signal to the gNB. PDCCH may serve as an implicit indication that interference may not be present or moderate. The gNB may transmit data. PDCCH may be generated whenever the gNB has data to transmit regardless channel is busy or not. LBT may or may not be performed before transmission at the gNB. LBT may be performed at the UE.

Or the gNB may perform LBT before transmission. When channel is busy, the gNB may send a very short signal to the UE. A very short signal may cause minimal interference to other device(s). The UE may send RTR signal to the gNB. The gNB may transmit PDCCH and data even if channel is busy. PDCCH may be generated whenever the gNB has data to transmit regardless channel is busy or not. LBT may or may not be performed before transmission at the gNB. LBT may be performed at the UE.

A short signal may be "very short", "super short", "really short", "quite short", "rather short", "short", "almost short" signals or the like.

Alternatively, the gNB may perform LBT before transmission. When channel is busy, the gNB may send PDCCH to the UE with indication of which beam is busy and which is not. The UE may send RTR signal to the gNB with indication which receiving beam is clear and which is not clear. The gNB may transmit data in the beam which is clear at the UE even if channel is busy at the gNB. This could increase efficiency of resource utilization for the DL.

Figure 11:
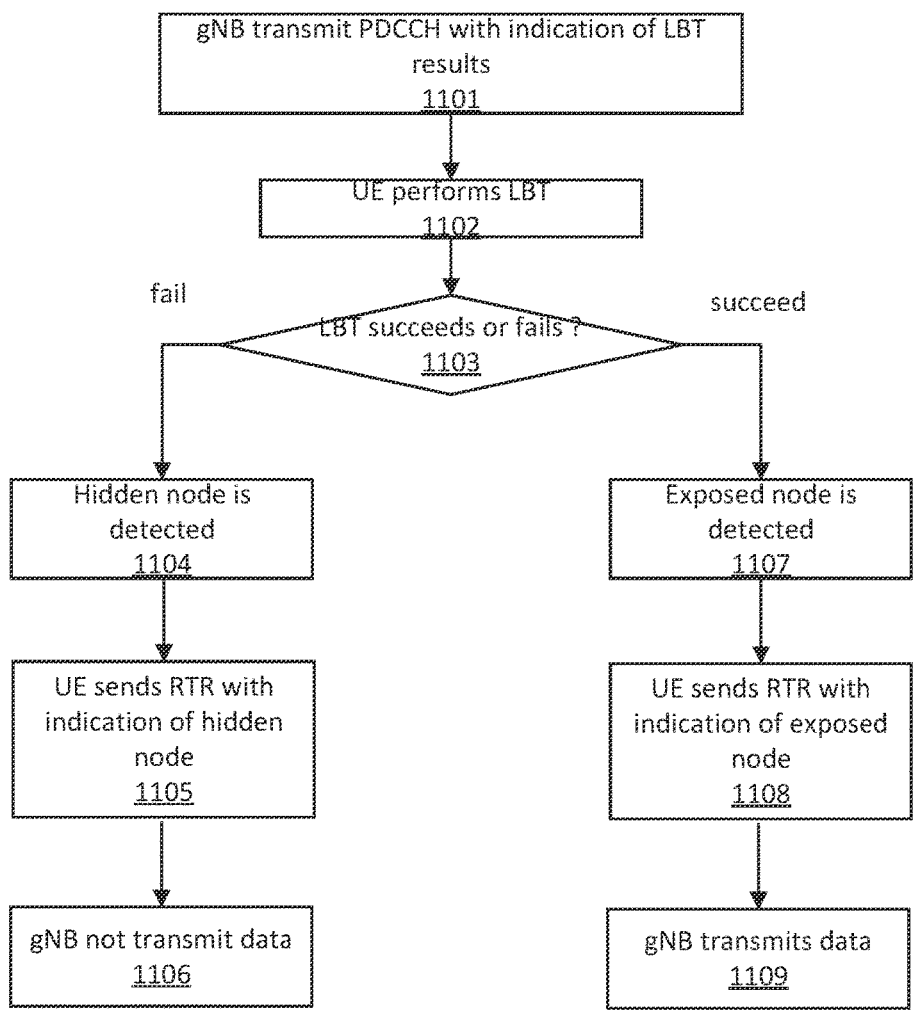
FIG. 11 shows a scheme for UE to handle downlink assignment.

FIG. 11 shows a scheme for the UE to handle downlink assignment 1100. At step 1101, the gNB may transmit the PDCCH to the UE with an indication of the LBT results. At step 1102, the UE may perform LBT. If LBT fails (step 1103), a hidden node may be detected (step 1104), the UE may send the RTR with an indication of the hidden node (step 1105), and the gNB may not transmit data (step 1106). If LBT succeeds (step 1107), an exposed node may be detected (step 1107), and the UE may send the RTR with an indication of the exposed node (step 1108), and the gNB may transmit data (step 1109).

Figure 12:
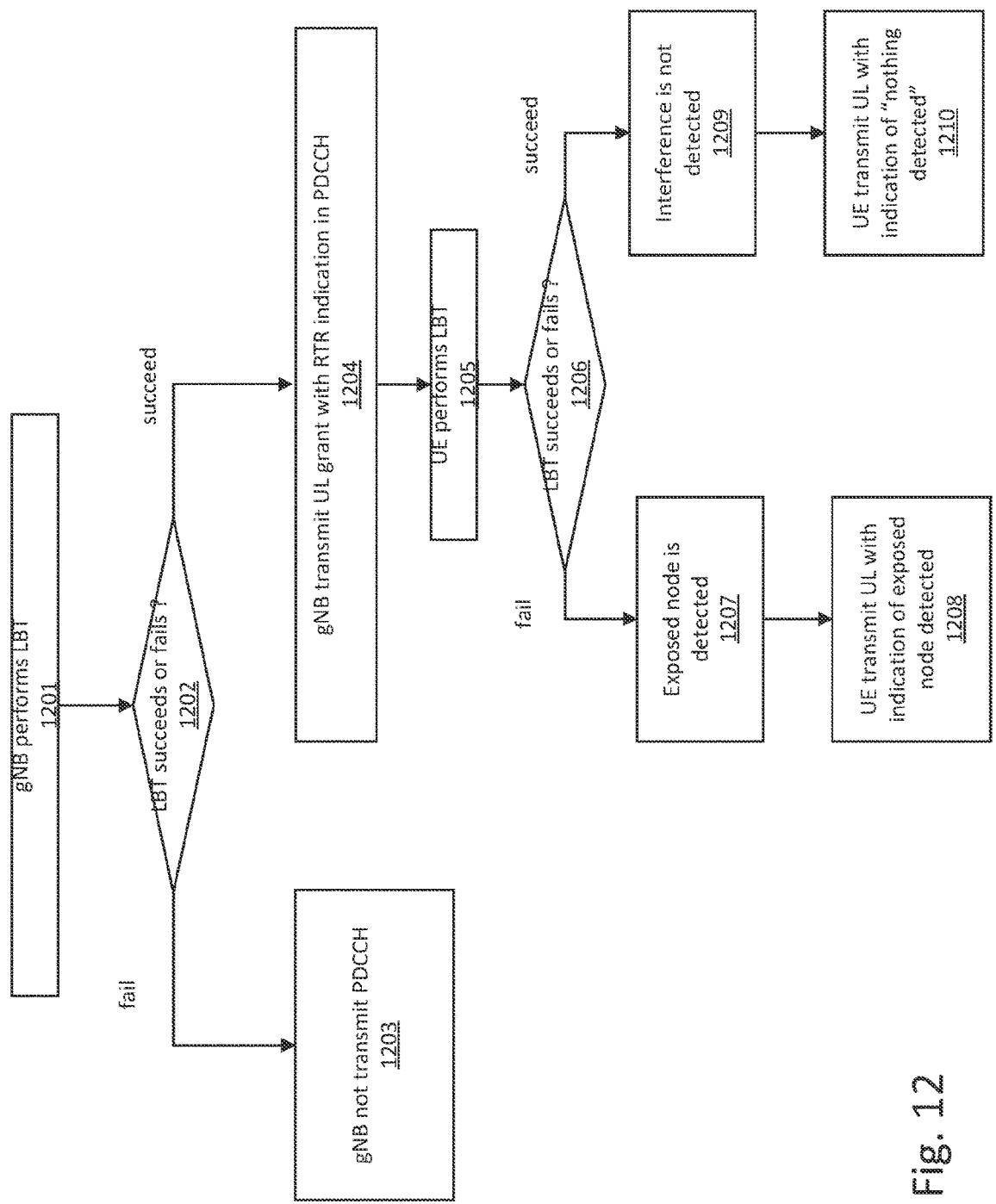
FIG. 12 shows a scheme for UE to handle uplink grant.

FIG. 12 shows a scheme for the UE to handle an uplink grant 1200. For UL Grant the gNB may perform LBT. At step 1201, the gNB may perform LBT. If LBT fails (step 1202), the gNB may not transmit the PDCCH (step 1203). If LBT succeeds (step 1202), the gNB may send an uplink grant in with an RTR indication in the PDCCH to the UE (step 1204). The RTR indication may be in uplink grant in the DCI carried in PDCCH. The UE may or may not perform LBT before transmission (step 1205). If LBT fails (step 1206), an exposed node may be detected (step 1207), and the UE may transmit the UL with an indication of an exposed node detected (step 1208). If LBT succeeds (step 1206), an interference may not be detected (step 1209), and the UE may transmit the UL with an indication of nothing detected (step 1210). Even when channel is busy, the UE may transmit PUSCH to the gNB. This could increase efficiency of resource utilization for the UL.

Alternatively, the gNB may send an uplink grant in PDCCH to the UE with indication which beam is clear and which beam is not clear for the gNB receiving. An RTR indicating which beam is clear and which beam is not clear for the gNB receiving may be carried in uplink grant in DCI in PDCCH. The UE may or may not perform LBT before transmission. If the UE performs LBT, if channel is not busy, the UE may transmit PUSCH. Even when channel is busy, the UE may transmit PUSCH. This could increase efficiency of resource utilization for the UL.

Figure 13:
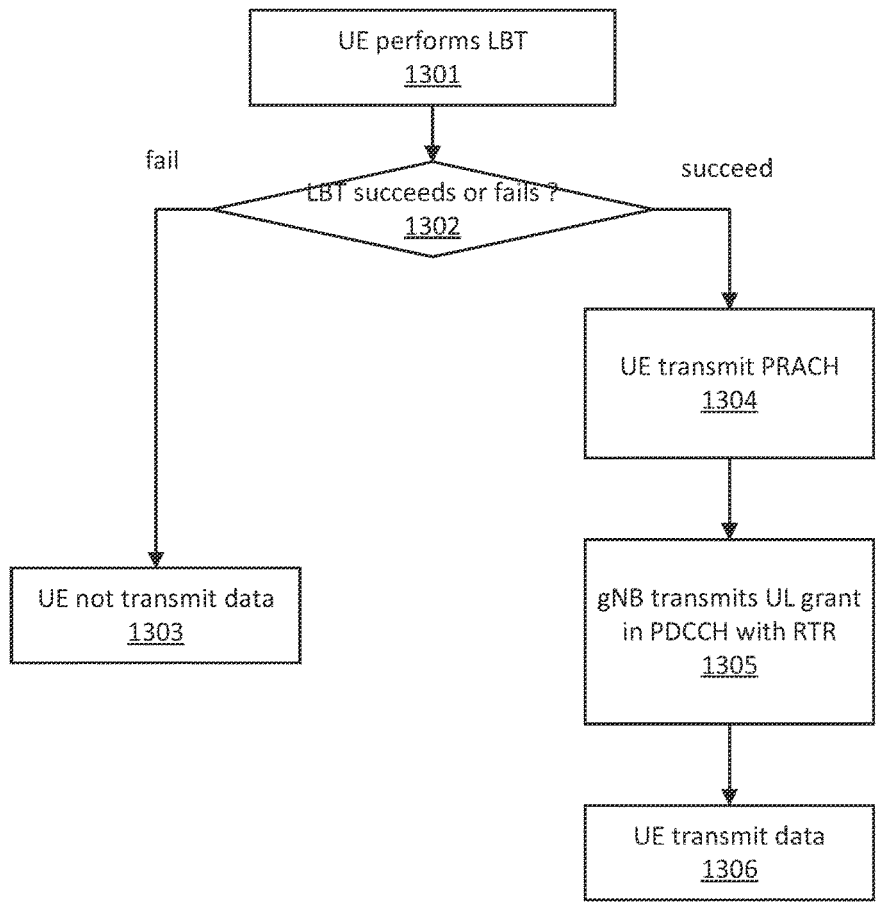
FIG. 13 a scheme for UE UL transmission.

FIG. 13 shows an example method for the UE requesting UL transmission 1300. For UL transmission requested by the UE, the UE may perform LBT (step 1301). If LBT fails (step 1303), then the UE may not transmit data (step 1303). If LBT succeeds (step 1302), then the UE may send PRACH to request an uplink transmission (step 1305). The request may also be using a very short signal, SR, PUCCH or with RTT indication to the gNB. Or the UE may send RTT signal to the gNB separately. The gNB may send uplink grant with RTR indication to the UE (step 1305). Once receiving UL grant with RTR, the UE may transmit PUSCH accordingly (step 1306).

Figure 14:
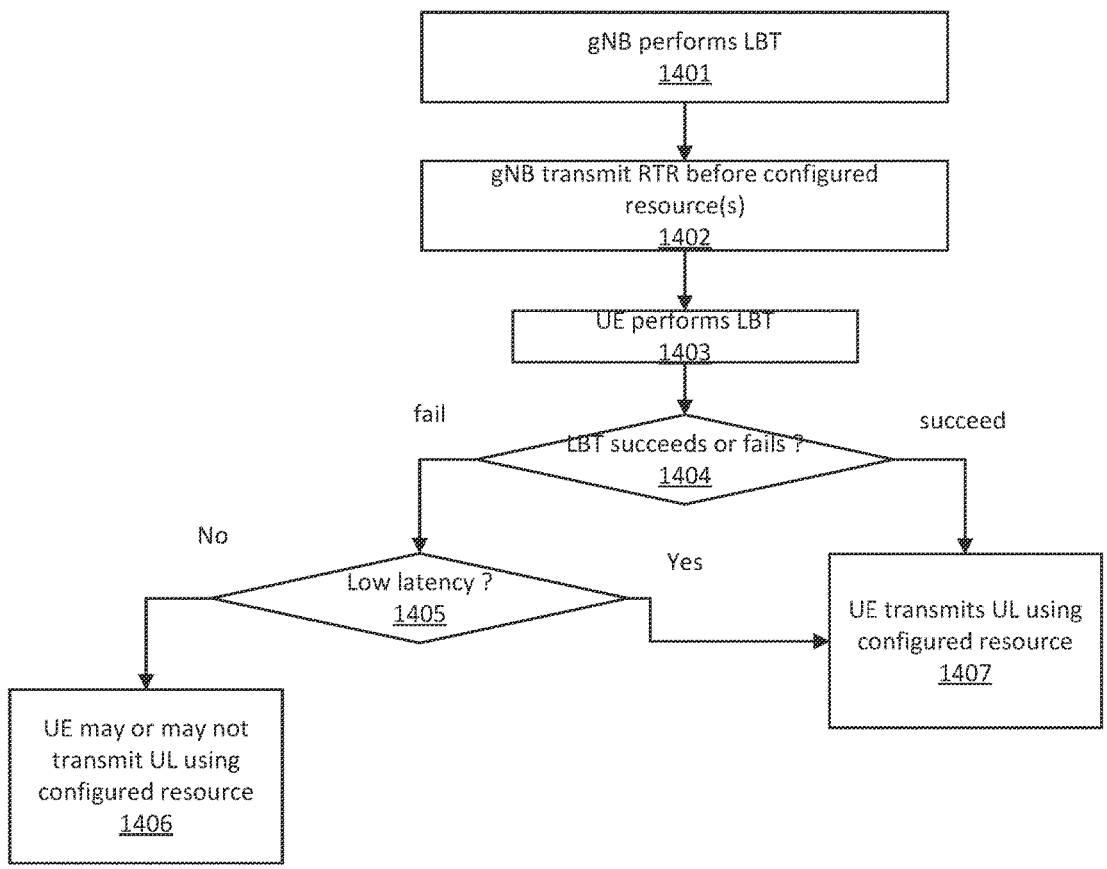
FIG. 14 shows a scheme for configured grant UE to handle exposed nodes.

FIG. 14 shows a scheme for a configured grant the UE to handle exposed nodes 1400. The gNB may perform LBT (step 1403). For configured grant, the gNB may send RTR signal to the UE before each configured resource (step 1042), before a group of configured resources or before every N configured resources. Once receiving RTR from the gNB for associated configured resource, the UE may perform LBT before transmission (step 1403). If LBT succeeds (step 1404), the UE may transmit in the UL using the configured resource (step 1407). If LBT fails (step 1404), if latency is required to be low (step 1405), the UE may transmit data even if channel is busy. If latency is not required to be low (step 1405), the UE may not transmit data (step 1406). LBT may or may not be performed before transmission. This could increase efficiency of resource utilization for the UL.

The gNB may send RTT signal to a UE or to a group of UEs in a group common PDCCH. The gNB may indicate to the UE(s) about hidden node and/or exposed node status to a UE or a group of UEs via GC-PDCCH. A special DCI format e.g., a new DCI format 2_x may be used to serve such purpose. a new DCI format 2_x may include field for indication of hidden node, exposed node, interference indication or the like.

The UE may indicate to the gNB(s) about hidden node, exposed node to a gNB or a group of the gNBs via GC-PUCCH or GC-PRACH or the like. GC-PRACH may be common for a group of the gNBs. GC-PRACH or GC-PUCCH may be configured by the gNB or NW. A Msg1 or MsgA may indicate hidden node, exposed node or include interference indication or the like.

Figure 15:
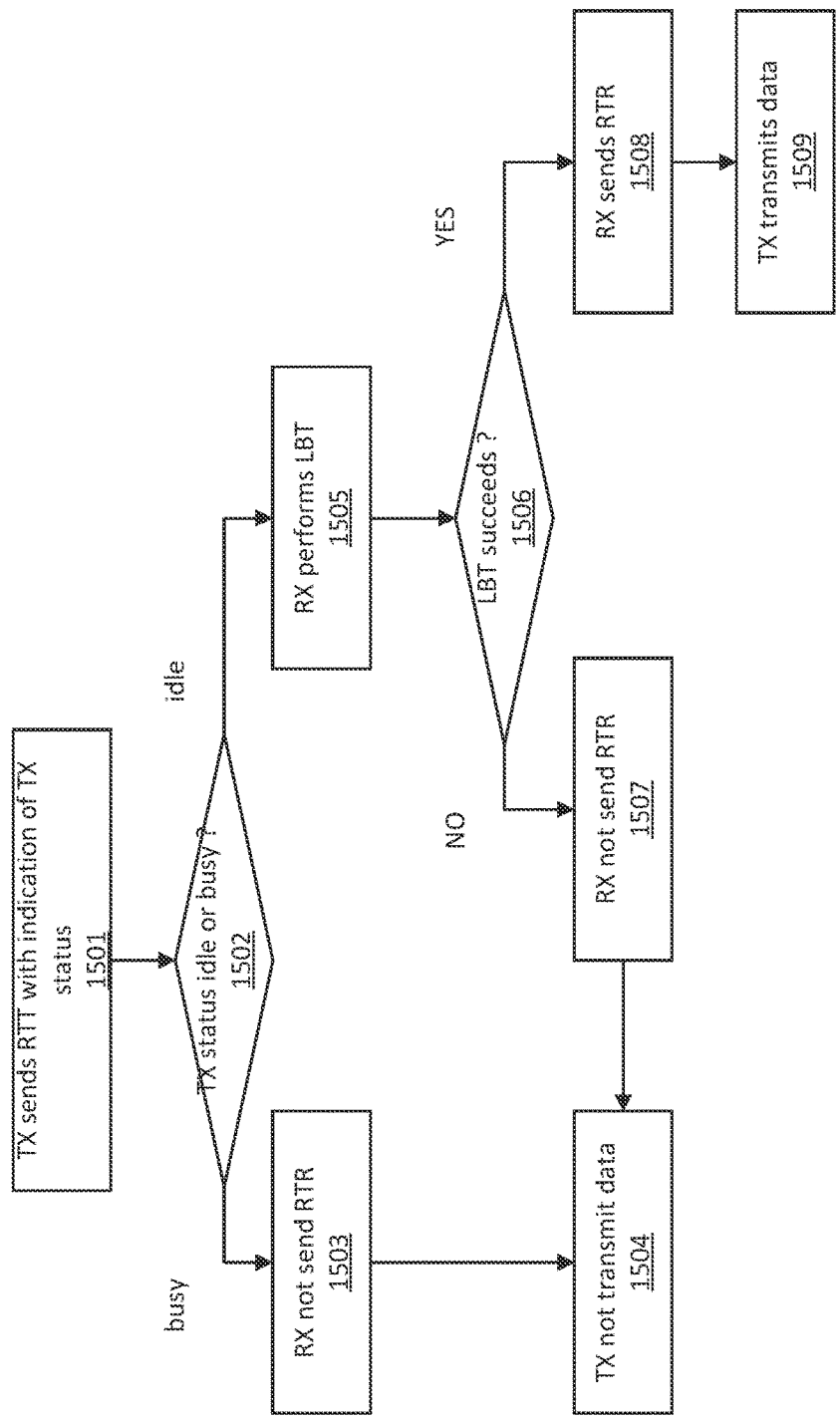
FIG. 15 shows a scheme to handle both exposed nodes and hidden nodes.

FIG. 15 shows an example for handling both exposed nodes and hidden nodes 1500. In this example, the TX may perform LBT before transmission. The TX may send RTT with an indication of the TX status (step 1501). If LBT succeeds, RTT with indication of "idle" may be sent. If LBT fails, RTT with indication of "busy" may be sent. RTT may be carried in GC-PDCCH using GC-DCI with GC-RNTI.

If the TX status is busy (step 1502), the RX may not send the RTR (step 1503), the TX may not transmit data (step 1504). If the TX status is idle (step 1502), the RX may perform LBT (step 1505). If LBT succeeds (step 1506), the RX may send the RTR (step 1508), and the TX may transmit data (step 1509). If LBT fails (step 1506), the RX may not send the RTR (step 1507), the TX may not transmit data (step 1504).

Figure 16:
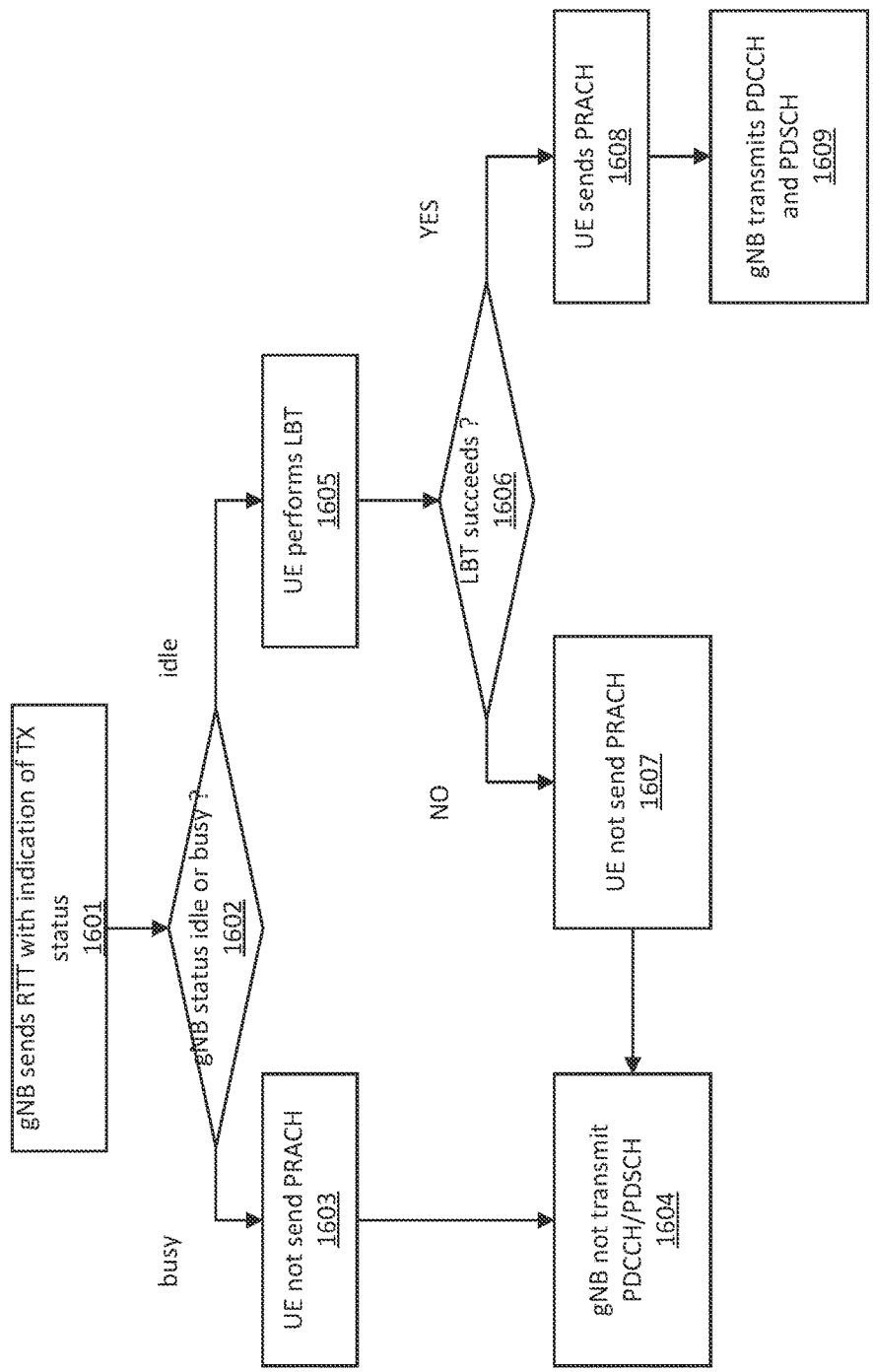
FIG. 16 shows a scheme for the gNB to handle both exposed nodes and hidden nodes.

FIG. 16 shows an example for the gNB to handle both exposed nodes and hidden nodes 1600. In this example, the gNB may perform LBT before transmission. The gNB may send PDCCH (as RTT) with an indication of the TX status (step 1601). If LBT succeeds, PDCCH/RTT with indication of "idle" may be sent. If LBT fails, PDCCH/RTT with indication of "busy" may be sent. The UE may send RTR.

If the gNB status is busy (step 1602), the UE may not send the PRACH (step 1603), and the gNB may not transmit the PDCCH and/or PDSCH (step 1604). If the gNB status is idle (step 1602), the UE may perform LBT (step 1605). If LBT succeeds (step 1606), the UE may send the PRACH (step 1608), and the gNB may transmit the PDCCH and/or PDSCH (step 1609). If LBT fails (step 1606), the UE may not send the PRACH (step 1607), the gNB may not transmit the PDCCH and/or PDSCH (step 1604).

Figure 17:
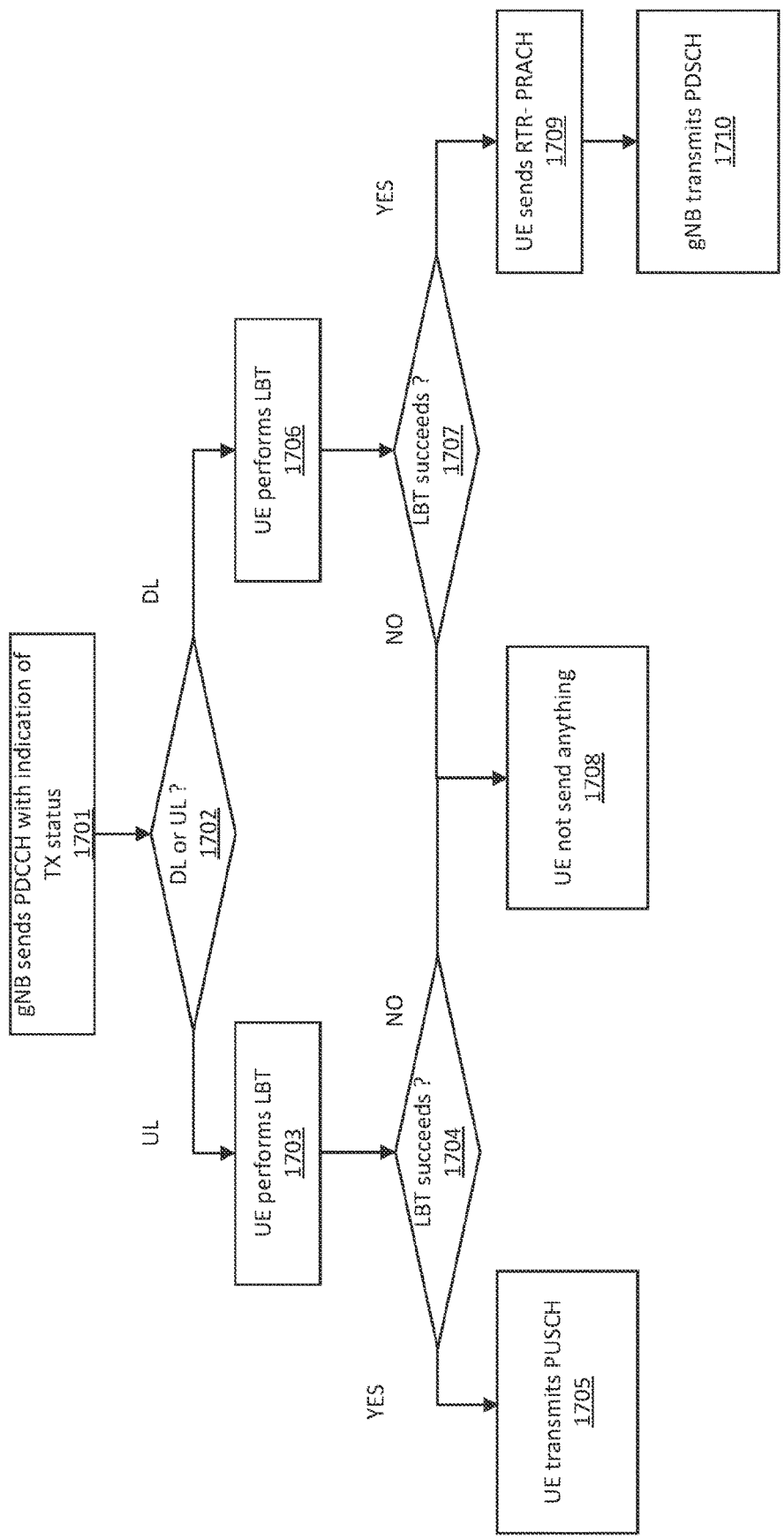
FIG. 17 shows a scheme for DL and UL transmission.

FIG. 17 shows an example for DL and UL transmission 1700. In this example, PDCCH may be used as RTT and/or RTR. For DL transmission, PDCCH may indicate RTT for PDSCH transmission at the UE and the UE may send RTR for PDSCH receiving. For UL transmission, PDCCH may indicate joint RTT/RTR for PUSCH transmission. In the example of FIG. 17, the gNB may send PDCCH with an indication of the TX status (step 1701). If the transmission is in the UL (step 1702), the UE may perform LBT (step 1703), if LBT succeeds (step 1704), the UE may transmit the PUSCH (step 1705). If LBT fails (step 1704), the UE may not send anything (step 1708). If the transmission is in the DL (step 1702), the UE may perform LBT (step 1706), if LBT succeeds (step 1707), the UE may transmit the RTR-PRACH (step 1709), and the gNB may transmit the PDSCH (step 1710). If LBT fails (step 1707), the UE may not send anything (step 1708).

Figure 18:
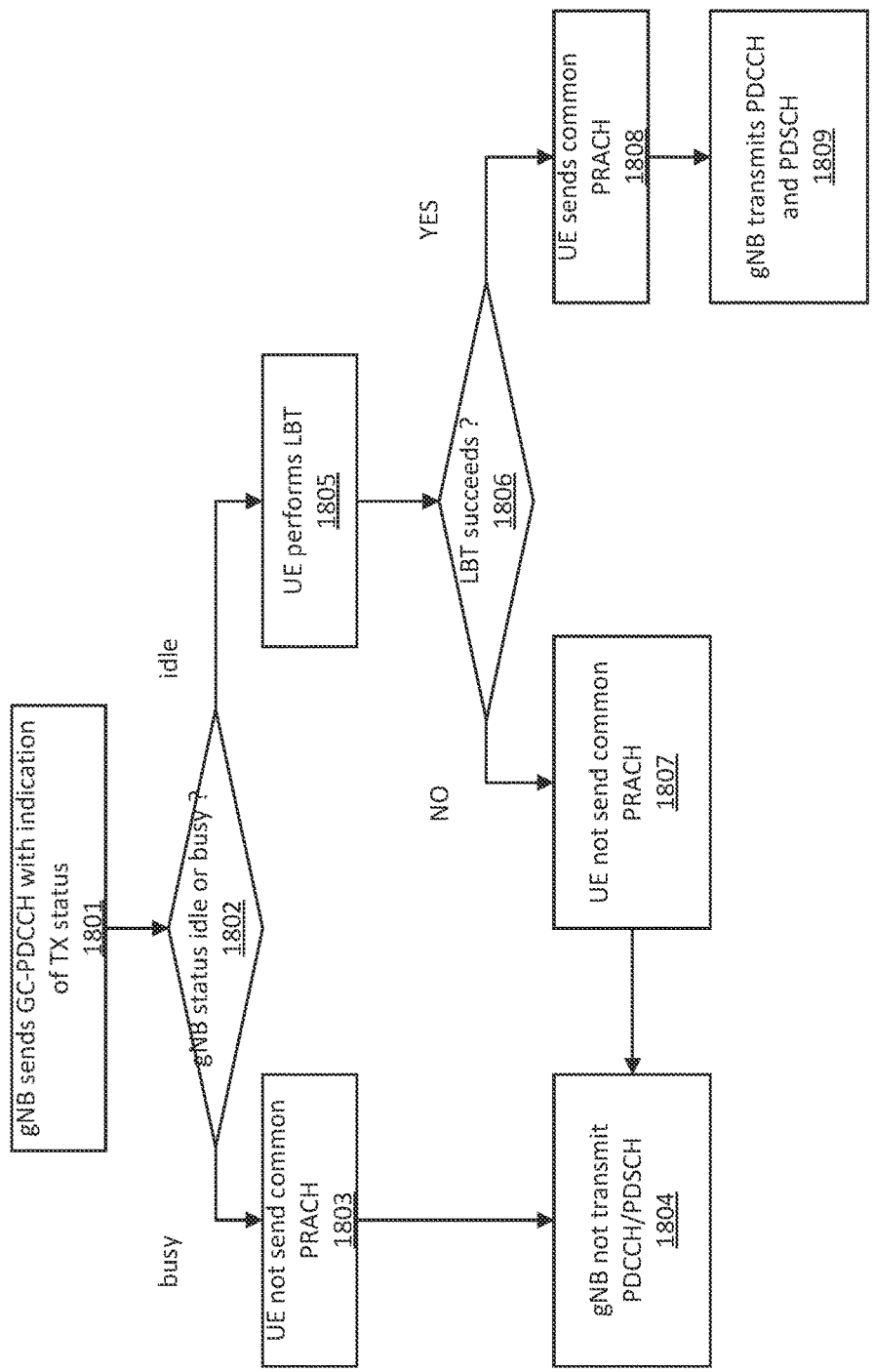
FIG. 18 shows a scheme for group common PDCCH (configured grant)

FIG. 18 shows an example for group common PDCCH (configured grant) 1800. The gNB may send GC-PDCCH with an indication of the TX status (step 1801). If the gNB status is busy (step 1602), the UE may not send the common PRACH (step 1803), and the gNB may not transmit the PDCCH and/or PDSCH (step 1804). If the gNB status is idle (step 1802), the UE may perform LBT (step 1805). If LBT succeeds (step 1806), the UE may send the common PRACH (step 1808), and the gNB may transmit the PDCCH and/or PDSCH (step 1809). If LBT fails (step 1806), the UE may not send the common PRACH (step 1807), the gNB may not transmit the PDCCH and/or PDSCH (step 1804).

Exposed node/hidden node may be indicated in UL grant and/or DL assignment. If the UE receives both UL grant and DL assignment, PDCCH/RTT with indication of "idle" and "busy" may assist the UE for UL transmission. For DL, regardless "idle" and "busy", the gNB may always transmit DL e.g., PDSCH. For UL, the UE may check the busy indicator, if "busy", the UE may not transmit UL e.g., PUSCH even if LBT is successful at the UE. If the busy indicator indicates "idle", then the UE may transmit UL, e.g., PUSCH even if the UE fails LBT.

Exposed node indication scheme is depicted in Table 24

TABLE 24

| Exposed node indication scheme | | |
|---|---|---|
| LBT gNB/UE | UE "idle" | UE "busy" |
| gNB "idle" | UL ok, DL ok | UL ok, DL bad |
| gNB "busy" | UL bad, DL ok | UL bad, DL bad |

Beam-specific exposed node indication scheme is depicted in Table 25.

TABLE 25

| Beam-specific exposed node indication scheme | | |
|---|---|---|
| LBT gNB/UE | UE beam k "idle" | UE beam k "busy" |
| gNB beam k "idle" | UL beam ok, DL beam ok | UL beam ok, DL beam bad |
| gNB beam k "busy" | UL beam bad, DL beam ok | UL beam bad, DL beam bad |

Exposed node may be separately indicated in PDCCH. The gNB may perform LBT before transmission. It is proposed that the gNB may send PDCCH with indication of exposed node status. If LBT succeeds, PDCCH/RTT with indication of "exposed node not present" may be sent. If LBT fails, PDCCH/RTT with indication of "exposed node present" may be sent.

In directional beam-based system, exposed node could cause that the resources may be under-utilized due to LBT failure. Therefore, exposed node indication in PDCCH may enhance the resource utilization and improve the efficiency of resource utilization and performance of the system.

The UE may send RTR. However, depending on the status or duration of exposed node, transmitted RTR may or may not experience the interference from exposed node at the gNB. If the gNB receives RTR from the UE, then the gNB may transmit data. If the gNB does not receive RTR from the UE, then the gNB may not transmit data. During exposed node duration, if robust RTR can be received, then the gNB may transmit DL even channel is busy. RTR may be repeated, or RTR repetition may be used. Power boost for RTR may be used. Lower code rate or lower modulation order may be used if channel-based or payload-based RTR is used. Repetition and/or power control may be used if signal-based or sequence-based RTR is used.

Since there is a time gap between PDCCH/RTT and RTR, therefore a cross slot scheduling may be used. In this case, PDCCH/RTT may be transmitted by the gNB first, then wait for RTR from the UE. Once RTR is received at the gNB, then the gNB may transmit PDSCH in different slot. K0>0 may be indicated. To save power, K0 may be configured with min K0 such that cross slot is always enabled.

Or a self-contained slot with PDCCH/RTT and RTR in the same slot may be used. In this case, PDCCH/RTT may be transmitted first, then wait for PUCCH/RTR. Once PUCCH/RTR is received, then the gNB may transmit PDSCH in the same slot. K0=0 may be indicated.

The following may be used:

PDCCH/RTT may be designed in DCI format. This may be done for both DL assignment and UL grant.

PUCCH/RTR may be designed in PUCCH format, e.g., short PUCCH format or long PUCCH format.

PRACH/RTR may be designed in PRACH and/or PRACH partitioning, or with dedicated PRACH.

PDCCH ordered PRACH based RTR may be used.

Contention-based or contention-free RACH may also be used.

4-step RACH or 2-step RACH may be used. In 4-step RACH, PRACH and msg3 and DMRS may be used. In 2-step RACH, MsgA may be used. PRACH, DMRS port/sequence, PUSCH payload, etc. may be used. SSB and PRACH association may be used. QCL association may be used.

For DL assignment, the gNB may send PDCCH with RTT. The gNB may send PDCCH as RTT or send GC-PDCCH as RTT.

PDCCH may serve as RTT or RTT may be carried in PDCCH. RTT may be indicated in DCI, for example DCI format 1_0, 1_1, etc. A new DCI field for RTT may be used. The gNB may transmit PDCCH even LBT fails before PDCCH transmission. Only the intended UE receives RTT. Other UE(s) will not receive RTT. The gNB may send PDCCH even LBT fails before PDCCH transmission or the gNB may send GC-PDCCH even LBT fails before GC-PDCCH transmission.

Enhancements to beam operation are described herein. Hidden node could cause interference to receiver when transmitter is not aware of hidden node. When transmitter succeeds LBT, it will make the transmission to receiver. However, receiver may not be able to receive the data correctly due to hidden node's interference. Receiver-assisted LBT could be used to mitigate hidden node issue. However, receiver assisted LBT requires heavy hand shaking between transmitter and receiver, which causes extra signaling overhead. It is desirable to enhance the performance of receiver assisted LBT while reduce the signaling overhead of receiver assisted LBT. Especially in a system where omni-directional LBT and directional LBT are supported. Both periodic and aperiodic traffic should be considered.

For DL assignment, the gNB may send a very short signal or RTT before PDCCH transmission. The UE may report RTR. The gNB may transmit PDCCH/PDSCH. K0 may be adjusted. Alternatively, the gNB may send PDCCH/RTT and the UE may send RTR. The gNB may transmit PDSCH. K0 may be adjusted.

For UL grant, the gNB may send a very short signal or RTT before PDCCH transmission. The UE may report RTR. The gNB may transmit PDCCH. The UE may transmit PUSCH. K2 may be adjusted. Alternatively, the gNB may send PDCCH/RTT/RTR and the UE may not send RTR. The UE may transmit PUSCH. K2 may be adjusted.

It is proposed to enable fast RTR feedback. The gNB may send a very short signal or RTT before PDCCH transmission, e.g., by indicating a TCI codepoint corresponding to two TCI states. The UE may report RTR immediately after receiving a very short signal or RTT without LBT if time gap (e.g., K0) is less than a threshold. Alternatively, the gNB may send PDCCH/RTT and the UE may send RTR immediately after receiving a PDCCH/RTT without LBT if time gap (e.g., K0) is less than a threshold. It is proposed to enable fast PUSCH transmission, the gNB may transmit PDCCH. The UE may transmit PUSCH immediately after receiving a PDCCH without LBT if time gap (e.g., K2) is less than a threshold. K2 may be adjusted. Alternatively, the gNB may send PDCCH/RTT/RTR and the UE may not send RTR. The UE may transmit PUSCH immediately after receiving a PDCCH/RTT/RTR without LBT if time gap (e.g., K2) is less than a threshold. K2 may be adjusted.

The gNB may indicate two beams for PDSCH receiving, e.g. by indicating a TCI codepoint corresponding to two TCI states. The UE may perform LBT for these two beams and send RTR for these two beams. One beam may be primary beam and the other beam may be secondary beam. The UE may indicate RTR for each beam. An example is shown in Table 26.

TABLE 26

| Beam RTR | | |
| --- | --- | --- |
| Beam | RTR | Bits |
| Primary beam | clear | 1 |
| Secondary beam | Not clear | 0 |

Two bits may be used. The 1st bit may indicate primary RTR, 2nd bit may indicate secondary beam RTR, 3rd bit may indicate ranking if primary beam is clear, and 4th bit may indicate secondary beam ranking if secondary beam is clear. For RTR, "1" may indicate "clear" and "0" may indicate "not clear". For ranking, "1" may indicate "high" and "0" may indicate "low". An example is shown in Table 27. In this case the indication may be "1110".

TABLE 27

| Beam RTR | | |
| --- | --- | --- |
| Beam | RTR | Ranking |
| Primary beam | clear | high |
| Secondary beam | clear | low |

The UE may also send only the "clear" beam(s). For example, if only primary beam is clear, then the UE may send RTR with primary beam. If only secondary beam is clear, then the UE may send RTR with secondary beam. If both primary and secondary beams are clear, then the UE may send RTR with both primary and secondary beams. The gNB may randomly select one beam for PDSCH transmission or select primary beam for PDSCH transmission.

If both primary and secondary beams are clear, then the UE may send ranking in addition to RTR with ranking of both primary and secondary beams. In the former case, both primary and secondary beams interference are below a threshold. In latter case, both primary and secondary beams interference are below a threshold and beam with lower interference has higher ranking. The gNB may select the higher ranking (less interference) for PDSCH transmission.

Figure 19:
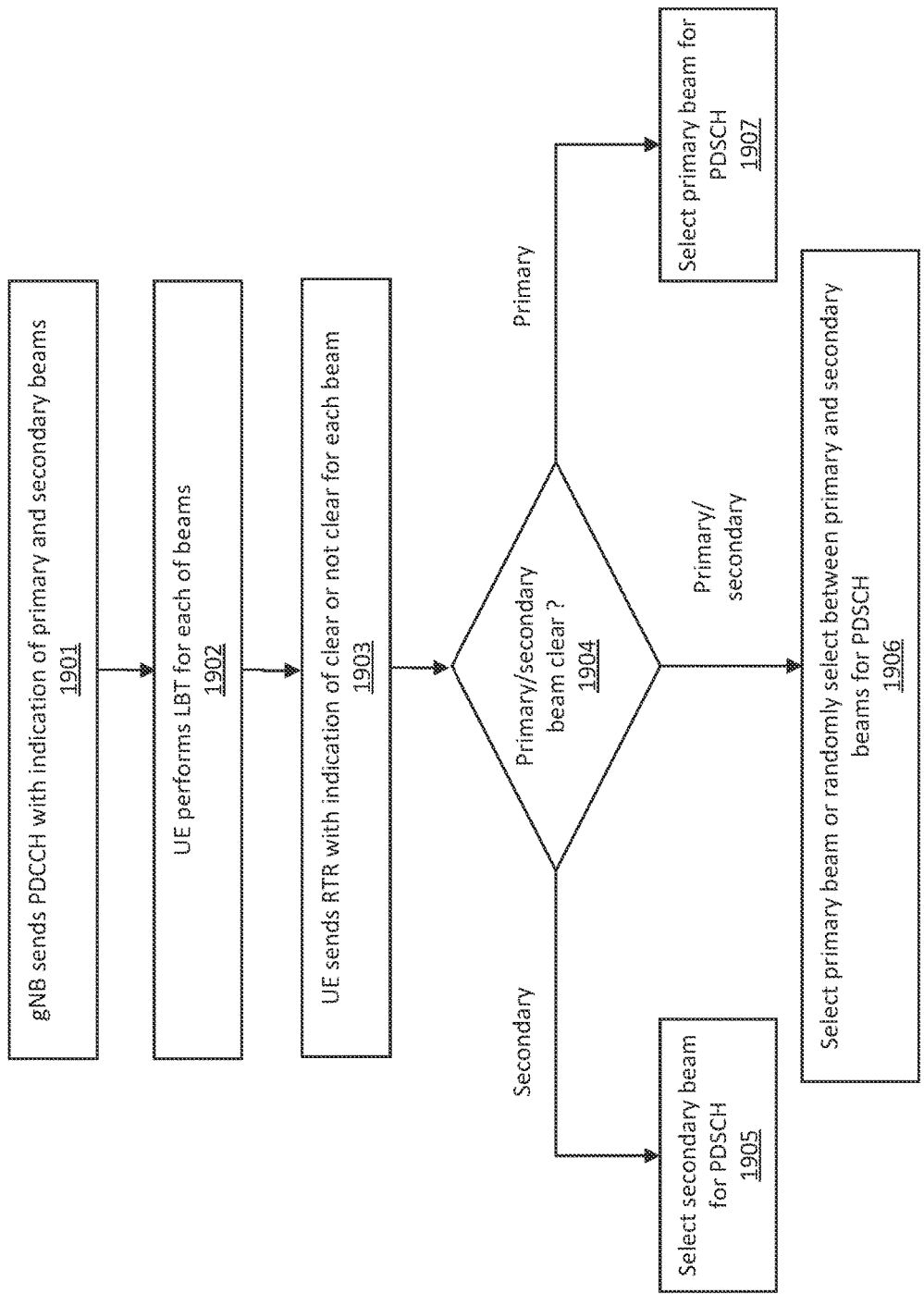
FIG. 19 shows a beam operation scheme with receiver assistance for primary/secondary beams.

FIG. 19 shows an example of beam operation scheme with receiver assistance for primary/secondary beams 1900. The gNB may send the PDCCH with an indication of the primary and secondary beams (step 1901). The UE may perform LBT for each of the beams (step 1902). The UE may send an RTR with an indication of clear or not clear for each beam (step 1903). If the primary beam is clear (step 1904), the primary beam may be selected for the PDSCH (step 1907). If the secondary beam is clear (step 1904), the secondary beam may be selected for the PDSCH (step 1905). If the primary beam and secondary beam are clear (step 1904), the primary beam may be selected for the PDSCH, or the primary beam and secondary beam may be randomly selected for the PDSCH (step 1906).

Figure 20:
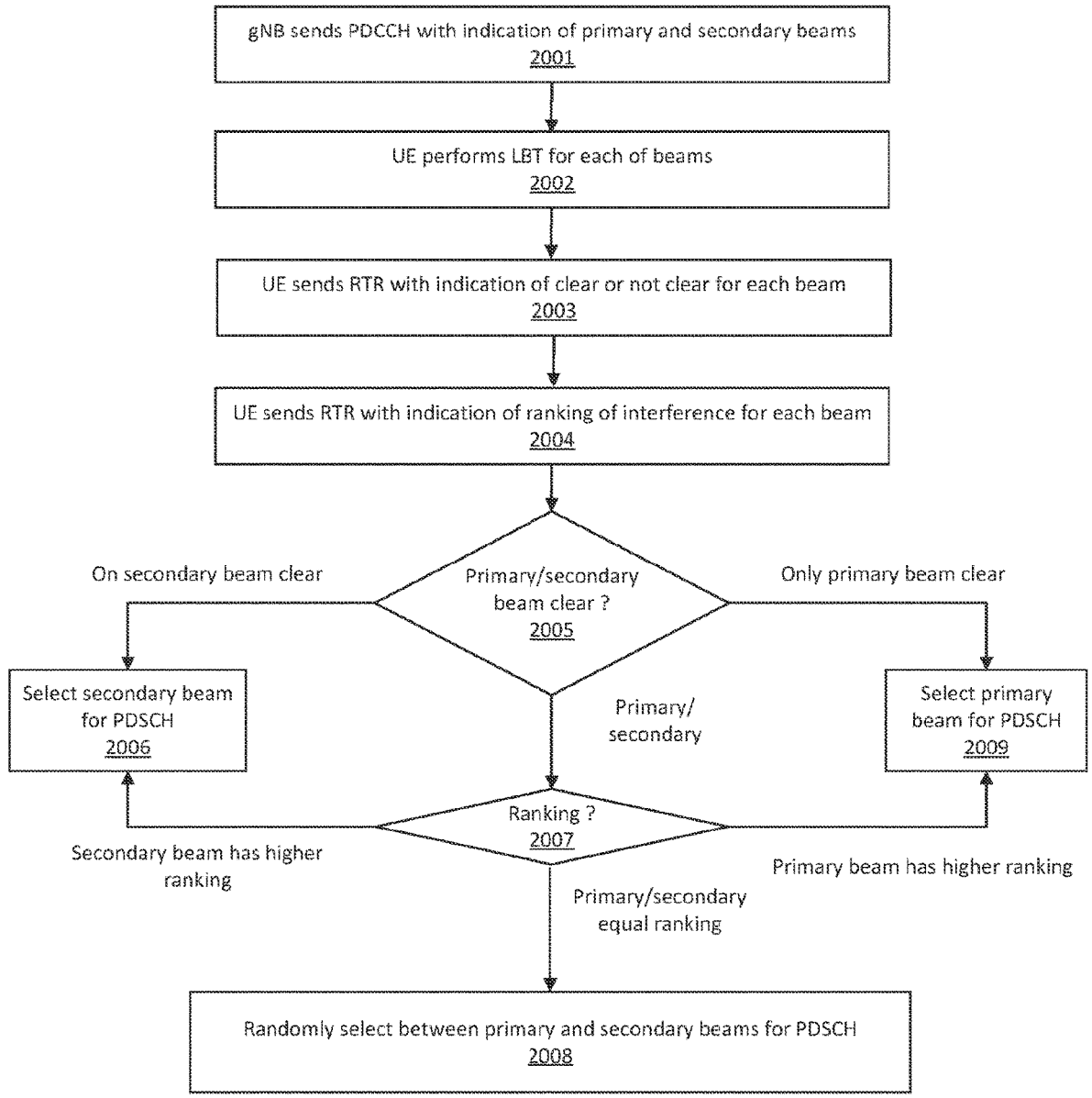
FIG. 20 shows a beam operation scheme with receiver assistance for multiple beams RTR with interference ranking.

FIG. 20 shows a beam operation scheme with receiver assistance for multiple beams RTR with interference ranking 2000. The UE may be configured to report RTR or not to report RTR. The UE may be configured to report RTR for single or multiple beams. The UE may be configured to also report interference ranking together with RTR reporting for beams. This technique may be extended to multiple beams or more than two beams. In the example of FIG. 20, the gNB may send the PDCCH with an indication of the primary and secondary beams (step 2001). The UE may perform LBT for each of the beams (step 2002). The UE may send an RTR with an indication of clear or not clear for each beam (step 2003). The UE may send an RTR with an indication of a ranking of interference for each beam (step 2004). If the primary beam is clear (step 2005), the primary beam may be selected for the PDSCH (step 2009). If the secondary beam is clear (step 2005), the secondary beam may be selected for the PDSCH (step 2006). If the primary beam and secondary beam are clear (step 2005), and the primary beam has a higher ranking than the secondary beam (step 2007), the primary beam may be selected for the PDSCH (step 2009). If the primary beam and secondary beam are clear (step 2005), and the secondary beam has a higher ranking than the primary beam (step 2007), the secondary beam may be selected for the PDSCH (step 2006). If the primary beam and secondary beam are clear (step 2005), and the primary and secondary beams have equal rankings (step 2007), the primary beam and secondary beam may be randomly selected for the PDSCH (step 2008).

A coexistence mechanism for LBT mode is described herein. In 52.6 GHz system, LBT may be used. However, when interference is static or not present, no-LBT mode may be used. Therefore, in some condition, LBT may be required. In other condition, LBT may not be required. It is desirable to design a coexist mechanism for LBT mode and no-LBT mode in 52.6 GHz system.

It is proposed to have LBT mode and non-LBT mode coexist in a system such as 52.6 GHz system. It is proposed to have coexist mechanism that enables switching and adapting between LBT mode and no-LBT mode. It is proposed the triggering mechanism for LBT operation. It is proposed to have configured rules as well as conditions and criteria for triggering the switching and adaptation between LBT mode and no-LBT mode.

For system optimization, both LBT mode and non-LBT mode may coexist in a flexible way. For example, when interference is more dynamic, LBT may be used. When interference is static or not present, no-LBT mode may be used. Therefore, in some condition, LBT may be required. In other condition, LBT may not be required.

For example, the LBT mode may be triggered at the gNB and/or the UE. When the LBT mode is triggered at the gNB, the gNB may indicate the selected LBT mode to the UE. For example, the gNB may indicate the LBT mode or no-LBT mode to the UE in a cell-specific manner. The UEs in a cell may receive a cell-specific indication for the LBT mode or no-LBT mode. Such a cell-specific indication for the LBT mode or no-LBT mode may be carried in system information, a broadcast signal or channel, or the like. The UEs in a cell may use the same LBT mode or no-LBT mode. For example, the gNB may indicate the LBT mode or no-LBT mode to the UE in a UE-specific manner. A UE may receive a UE-specific indication for the LBT mode or no-LBT mode. Such a UE-specific indication for the LBT mode or no-LBT mode may be carried in UE dedicated RRC signaling, MAC CE, DCI in PDCCH, or the like. Different UEs may use different LBT modes. Some UEs may use LBT mode while other UEs may use no-LBT mode. When LBT is triggered at the UE, the UE may report the selected LBT mode to the gNB. The gNB may determine the final LBT mode or no-LBT mode based on reported LBT mode or no-LBT mode from the UE(s). Alternatively, the UE may decide the LBT mode or no-LBT mode autonomously and perform the selected LBT before transmission.

To have an accurate measurement for interference landscape, the UEs may perform measurement and report or suggest whether LBT should be used or not. For example, a long term LBT may be conducted for measurement. When measurements indicate that interference is not present for a period of time, e.g., longer than an time (pre-) configured threshold, then the UE may determine that interference is absent, or low if present, and such condition may be persistent for a period of time. The UE may suggest LBT may not be needed.

When the gNB receives the LBT report, the gNB may decide whether to use LBT or not in the system for a period of time. Once the time period expires, the LBT decision procedure may be conducted again. Condition may be reevaluated for LBT whether LBT is needed or not. If all the UEs may suggest that LBT may not be needed, then the gNB may decide not to use LBT. If some UEs suggest that LBT may not be needed, then the gNB may decide not to use LBT based on a predefined or (pre-) configured rule(s), e.g., majority rule.

The UE may report LBT mode and time duration for LBT to use. The gNB may indicate LBT mode the time duration to use.

To enable coexistence mechanism for LBT mode and no-LBT mode, it is proposed LBT may be enabled if needed and may be disabled if not needed. Alternatively, default configuration may always enable LBT and disable LBT when not needed. Such LBT disabling may be done using explicit signaling or implicit indication. Implicit indication may include a timer or counter, when inactivity timer or counter expires, then operation switch back to default LBT. Alternatively, default operation may be set to no-LBT and when needed, switch to LBT using explicit signaling and/or implicit indication using timer and counter as described previously.

Explicit signaling may be used to enable and disable LBT or no-LBT operation. Combination of explicit signaling and implicit indication may be used. If explicit signaling is received before time expires, then switching is performed, Otherwise, switching is performed after timer expires.

LBT may be enabled in case it is required. Enabling and disabling and/or activation and deactivation may be based on DCI, MAC CE, RRC configuration or a combination of RRC configuration with activation by DCI or a combination of RRC configuration with activation by MAC CE. GC-PDCCH may be used to enable or disable LBT mode or indicate LBT mode.

An example for LBT indication by PRACH partitioning scheme is shown in Table 28 below.

TABLE 28

LBT indication by PRACH partitioning scheme

| PRACH Partitioning | Indication |
|---|---|
| PRACH partitioning 1 | Suggested "LBT" |
| PRACH partitioning 2 | Suggested "No LBT" |

An example for LBT indication by PUCCH partitioning scheme is depicted in Table 29 below.

TABLE 29

LBT indication by PUCCH partitioning scheme

| PUCCH partitioning | Indication |
|---|---|
| PUCCH partitioning 1 | Suggested "LBT" |
| PUCCH partitioning 2 | Suggested "No LBT" |

An example for LBT indication by PRACH sequence scheme is depicted in Table 30 below.

TABLE 30

LBT indication by PRACH sequence scheme

| PRACH Partitioning | Indication |
|---|---|
| PRACH sequence x | Suggested "LBT" |
| PRACH sequence y | Suggested "No LBT" |

Alternatively, one or multiple PRACH either sequence, RO, freq-only resource, time-only resource, or combination of any or all of them may be configured or reserved for LBT mode indication.

Association between SSB and PRACH may be considered. PRACH may be associated with directional beam. The UE may indicate beam specific LBT mode. One SSB may be associated with two PRACH. One PRACH may be used to indicate LBT and the other PRACH may be used to indicate no-LBT. The UE may use one of these two PRACH to indicate SSB index (beam index) and LBT mode simultaneously. The UE may report beam specific LBT information including SSB index, CRI, beam ID and LBT mode simultaneously to the gNB.

For another example, the UE may recommend the LBT or not. LBT mode may be indicated using PRACH/PUCCH hybrid scheme as depicted in Table 31 below:

TABLE 31

LBT indication by PRACH/PUCCH hybrid scheme

| PRACH Partitioning | Indication |
|---|---|
| PRACH | Suggested "LBT" |
| PUCCH | Suggested "No LBT" |

The UE may also suggest LBT or no LBT via MAC CE. The UE may also suggest or report LBT or no LBT or corresponding capability via RRC.PUSCH resources partitioning or PUSCH configuration subject to LBT versus PUSCH configuration not subject to LBT may also be considered and used. RTR, LBT result or both at the receiver may be used. Instead of RX sending RTR to the TX, the receiver may instead send to the TX its LBT results. Similarly, instead of the TX sending RTT to the RX, it may send its LBT results to the RX. The LBT failure or Status at any given node may take into account the LBT results at both (or more) nodes involved in the communication. The LBT results may be signaled between nodes, using DCI signaling e.g., using approaches similar to the solutions and methods described for the signaling of RTR, RTT or CSI or the like. RTR may be used interchangeably with "LBT result at the receiver" and RTT may be used interchangeably with "LBT result at the transmitter".

LBT adaptation may be performed per cell or per UE. The LBT mode, no-LBT mode or LBT sub-mode may be indicated to the UE in a per cell manner or per UE manner. For example, system information or broadcast information may be used to indicate LBT mode, no-LBT mode or LBT sub-mode to UE in a per cell manner. Higher layer signaling or L1/2 signaling may be used to indicate the LBT mode, no-LBT mode or LBT sub-mode to UE in a per UE manner. RRC, MAC CE or DCI in PDCCH may be used to indicate LBT mode, no-LBT mode or LBT sub-mode to UE in a per UE manner.

The LBT mode, no-LBT mode or LBT sub-mode may be indicated to the UE in a per UE group manner. For example, higher layer signaling or L1/2 signaling may be used to indicate the LBT mode, no-LBT mode or LBT sub-mode to the UE in a per UE group manner. RRC, MAC CE or DCI in the PDCCH may be used to indicate the LBT mode, no-LBT mode or LBT sub-mode to the UE in a per UE group manner. A group common PDCCH may be used to indicate the LBT mode, no-LBT mode or LBT sub-mode to the UE in a per UE group manner.

The LBT mode, no-LBT mode or LBT sub-mode may also be the same or different between the gNB and UE. For example, the gNB may use one LBT mode, no-LBT mode or LBT sub-mode while the UE may use another LBT mode, no-LBT mode or LBT sub-mode. The gNB may use one LBT mode, no-LBT mode or LBT sub-mode while indicating to the UE to use another LBT mode, no-LBT mode or LBT sub-mode. The LBT mode, no-LBT mode or LBT sub-mode may be indicated to the UE in a per beam, a per beam pair, or per beam group manner. For example, higher layer signaling or L1/2 signaling may be used to indicate the LBT mode, no-LBT mode or LBT sub-mode to the UE in a per beam manner or a per beam pair manner. The RRC, MAC CE or DCI in PDCCH may be used to indicate the LBT mode, no-LBT mode or LBT sub-mode to the UE in a per beam manner or a per-beam pair manner. A group common PDCCH may be used to indicate the LBT mode, no-LBT mode or LBT sub-mode to the UE in a per beam manner or a per beam pair manner. TCI or a unified TCI may be used to indicate the LBT mode, no-LBT mode or LBT sub-mode to the UE in a per beam manner or a per beam pair manner. The LBT mode, no-LBT mode or LBT sub-mode may be indicated to the UE in a per component carrier (CC) manner or per CC group manner. Different CCs or CC groups may use different LBT mode, no-LBT mode or LBT sub-mode. For example, one CC may use one LBT mode, no-LBT mode or LBT sub-mode while another CC may use another LBT mode, no-LBT mode or LBT sub-mode.

Figure 21:
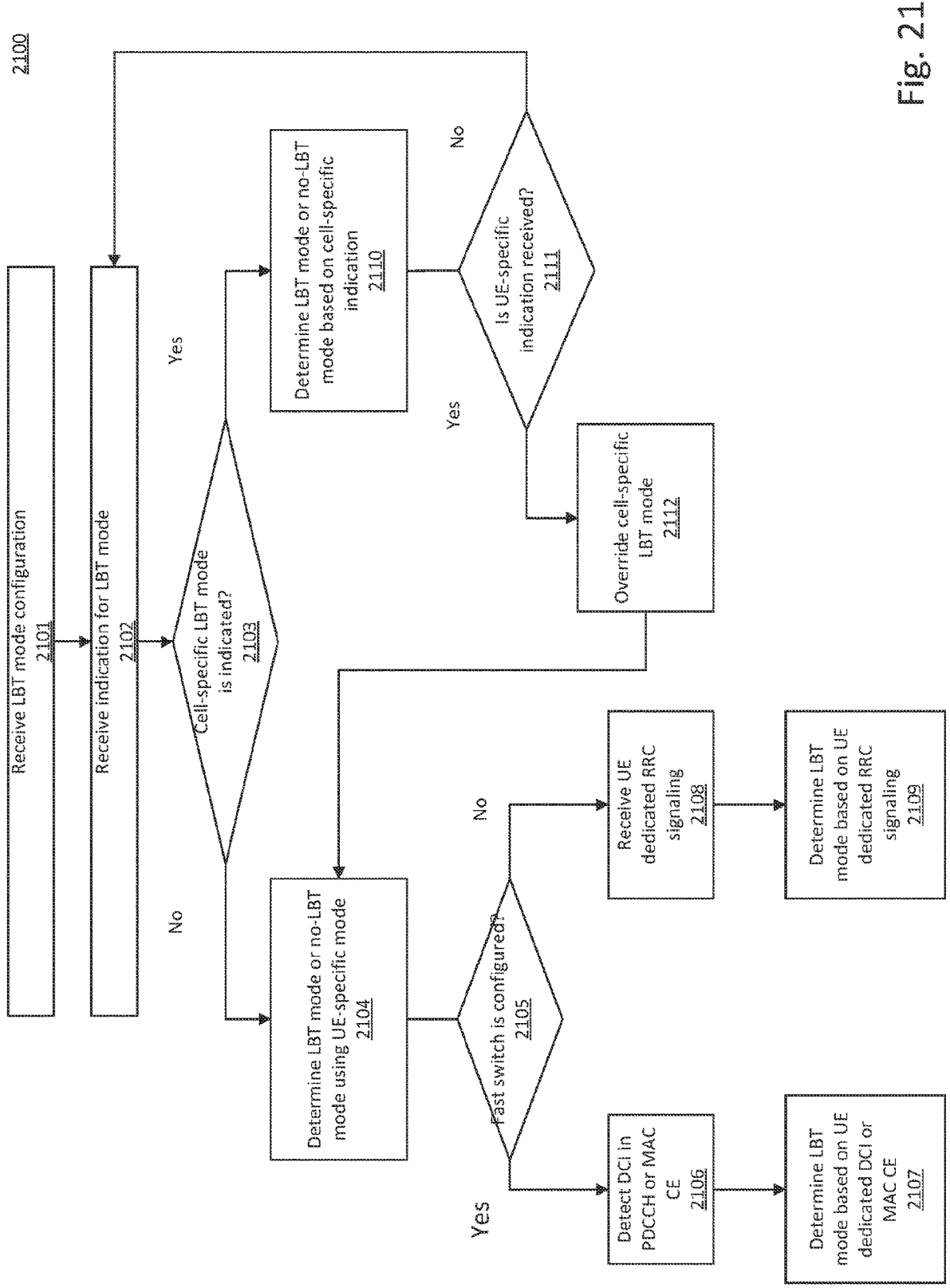
FIG. 21 shows an example method of an LBT mode and no-LBT indication.

FIG. 21 shows an example method for indicating an LBT mode 2100. In this example, the UE may receive configuration information for the LBT including LBT mode, no-LBT mode and/or LBT sub-mode(s) (step 2101). The UE may receive an indication for the LBT mode (step 2012). For example, the UE may receive an indication for the UE to perform LBT or no-LBT at the UE. The UE may receive an indication of what is performed, either LBT or no-LBT at the gNB. If the cell-specific LBT mode is indicated (step 2103), then the UEs in the cell may perform LBT. If cell-specific no-LBT mode is indicated, then the UEs in the cell may not perform LBT (step 2110). Similarly, if cell-specific LBT mode is indicated, then the UEs in the cell may assume that the gNB may perform LBT. The UE may determine the LBT mode or no-LBT mode based on the cell-specific indication (step 2110). If a UE-specific indication is received (step 2111), the UE may override the cell-specific LBT mode (step 2112). If a UE-specific indication is not received (step 2111), the UE may repeat step 2102.

If cell-specific no-LBT mode is indicated (step 2103), then the UEs in the cell may assume that the gNB may not perform LBT. If cell-specific LBT mode is not indicated (step 2104), or UE-specific LBT mode is indicated, then the UE may perform LBT or no-LBT based on the indication. Some UEs may perform LBT and other UEs may perform no-LBT based on the indication.

If fast switching for LBT mode or no-LBT mode is configured or indicated (step 2105), then the UE may detect the PDCCH or MAC CE (step 2106) and obtain an LBT mode indicator in the DCI or obtain an LBT mode indicator in the MAC CE (step 2107). If fast switching for LBT mode or no-LBT mode is not configured or indicated (step 2105), then the UE may receive RRC signaling (step 2108) and obtain LBT mode indicator in RRC information element (step 2109).

QCL may be used to determine sensing beam from transmission beam. Beam correspondence may be used to determine sensing beam from transmission beam. Transmission configuration indication (TCI) and spatial relation information may be used to indicate sensing beam or beams associated with a transmission beam or beams.

A sensing beam may be selected the same as a UL transmission beam at the UE. Beam correspondence may be assumed at the UE. If a UE transmission beam corresponds to a certain TCI state for a certain UE, the UE may use the same beam for sensing. If a TCI is used as QCL source (e.g., Type D QCL) for another TCI for a certain UE, then the UE transmission beam corresponding to the another TCI may be used as the sensing beam for transmission with the TCI. However, if TCI is not used as the QCL source (e.g., Type D QCL) for the TCI for any UE, then the UE may not use the transmission beam corresponding to this TCI as the sensing beam for transmission with the TCI. However, if beam correspondence is not supported at UE, then a certain dB beamwidth or the like, e.g., Y dB beamwidth sensing beam may be used. For example, Y may be 3 dB.

If the UE is indicated to transmit with a beam corresponding to a certain SRS resource indicator (SRI), the UE may use the same beam for sensing. If the UE is indicated to transmit with a beam corresponding to a certain unified TCI, the UE may use the reception beam corresponding to the TCI for sensing. A wider sensing beam e.g., an omni-directional or pseudo-omni beam, may be used as a sensing beam for a narrower transmission beam. The gNB may indicate whether a wide beam or a wider beam may be used as a sensing beam for a narrow transmission beam or a narrower transmission beam. Multiple sensing beams may be used for a transmission beam.

A sensing beam may be selected to be the same as a DL transmission beam at gNB. Beam correspondence at gNB may be assumed. If a gNB transmission beam corresponds to a certain TCI state for a certain UE, the gNB may use the same beam for sensing. If a TCI is used as QCL source (e.g., Type D QCL) for another TCI for a certain UE, then the gNB transmission beam corresponding to the another TCI may be used as the sensing beam for transmission with the TCI. However, if TCI is not used as a QCL source (e.g., Type D QCL) for the TCI for any UE, then the gNB may not use the transmission beam corresponding to this TCI as the sensing beam for transmission with the TCI. If sensing with a beam without a corresponding reference signal (RS) is sent, then a certain dB beamwidth or the like, e.g., X dB beamwidth, sensing beam may be used. For example, X may be 3 dB. A quasi-omni beam may be used for sensing if there is no synchronization signal block (SSB) or RS transmitted with the quasi-omni beam.

Figure 22:
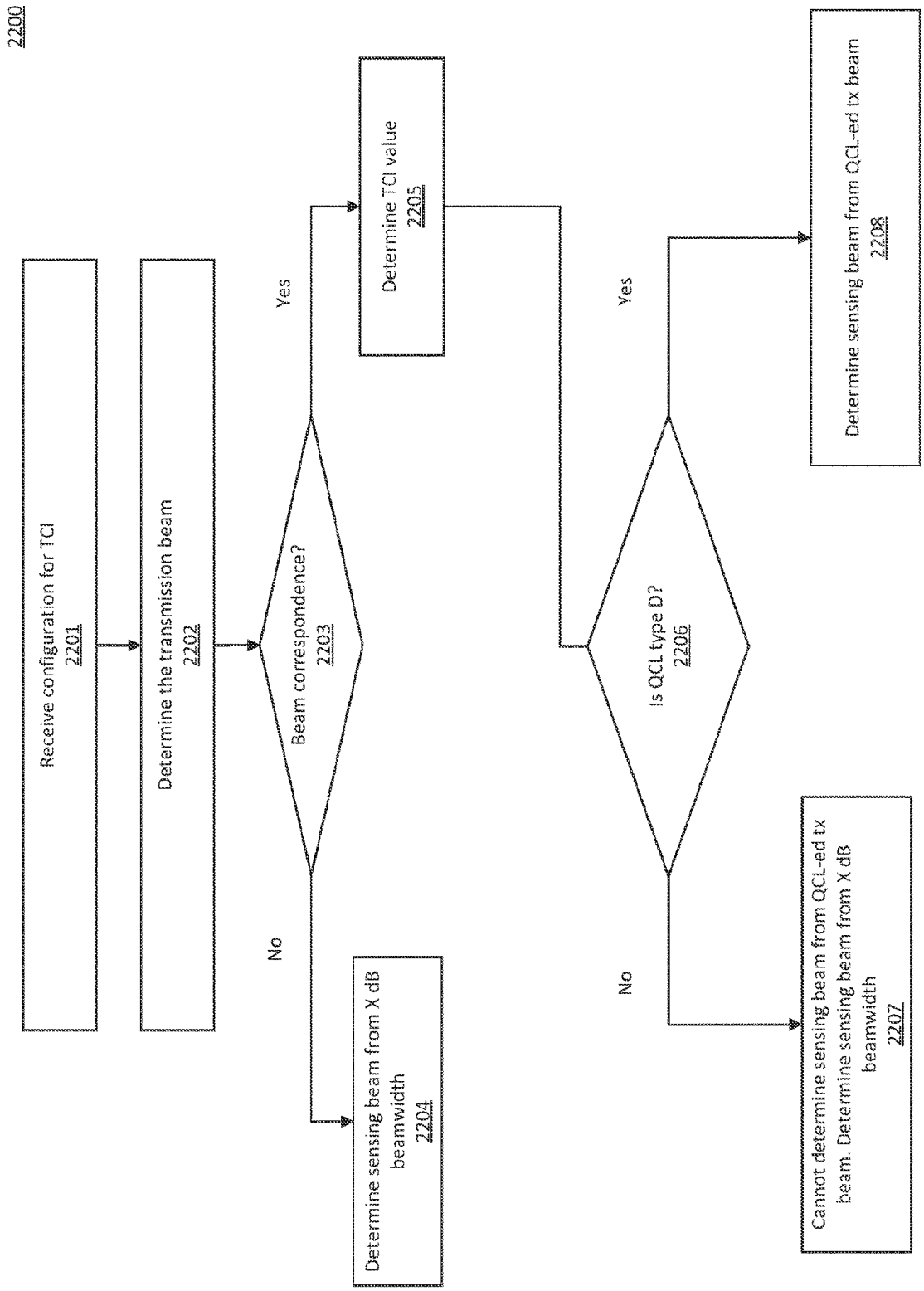
FIG. 22 shows an example method for determining a sensing beam from a transmission beam.

FIG. 22 shows an example method of determining a sensing beam from a transmission beam 2200. The UE may receive a configuration for TCI (step 2201). The UE may determine the transmission beam (step 2202). If beam correspondence is assumed or indicated (step 2203), then the UE may determine the value of TCI (step 2205). If it is QCL-ed with QCL type D (step 2206), then the UE may determine a sensing beam from the QCL-ed transmission beam (step 2208). If beam correspondence is not assumed, not indicated, or not supported (step 2203), then the UE may not determine a sensing beam from QCL-ed transmission beam. The UE may determine a sensing beam from a certain dB beamwidth or the like, e.g., X dB beamwidth (step 2204). If it is not QCL-ed with QCL type D (step 2206), then the UE cannot determine a sensing beam from the QCL-ed transmission beam, but the UE may determine a sensing beam from a certain dB beamwidth or the like, e.g., X dB beamwidth (step 2207).

Figure 23:
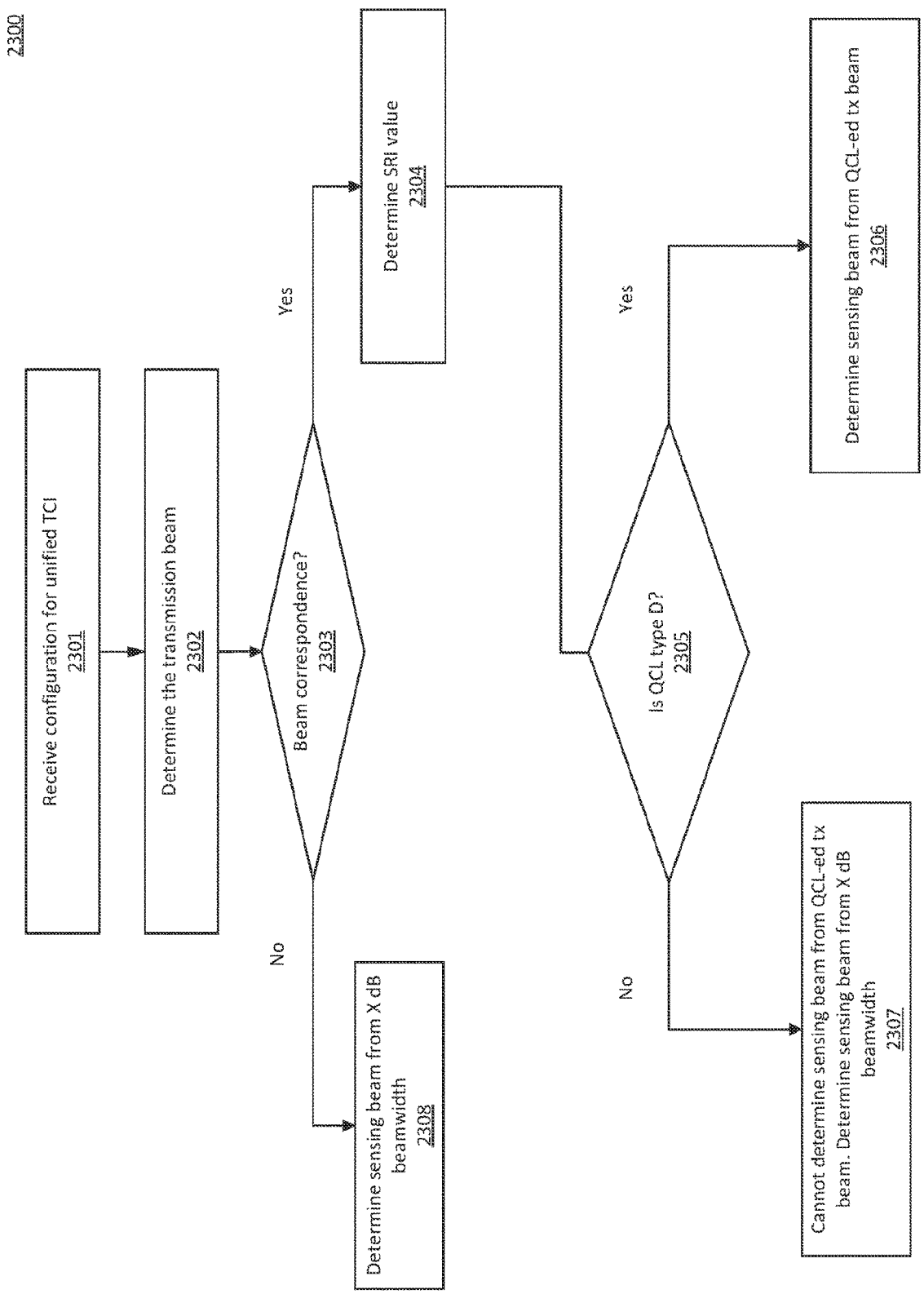
FIG. 23 shows an example method for determining a sensing beam from a transmission beam using a unified TCI approach.

FIG. 23 shows an example method of determining a sensing beam from the transmission beam using a unified TCI approach 2300. The UE may receive a configuration for TCI (step 2301). The UE may determine the transmission beam (step 2302). If beam correspondence is assumed, indicated, or supported (step 2303), then the UE may determine the value of the SRI (step 2304). If it is QCL-ed with QCL type D (step 2305), then the UE may determine a sensing beam from the QCL-ed transmission beam (step 2306). If beam correspondence is not assumed, not indicated, or not supported (step 2303), then UE may not determine the sensing beam from the QCL-ed transmission beam, and the UE may determine a sensing beam from a certain dB beamwidth or the like, e.g., X dB beamwidth (step 2308). If it is not QCL-ed with QCL type D (step 2305), then the UE cannot determine a sensing beam from the QCL-ed transmission beam, and the UE may determine a sensing beam from a certain dB beamwidth or the like, e.g., X dB beamwidth (step 2307).

Figure 24:
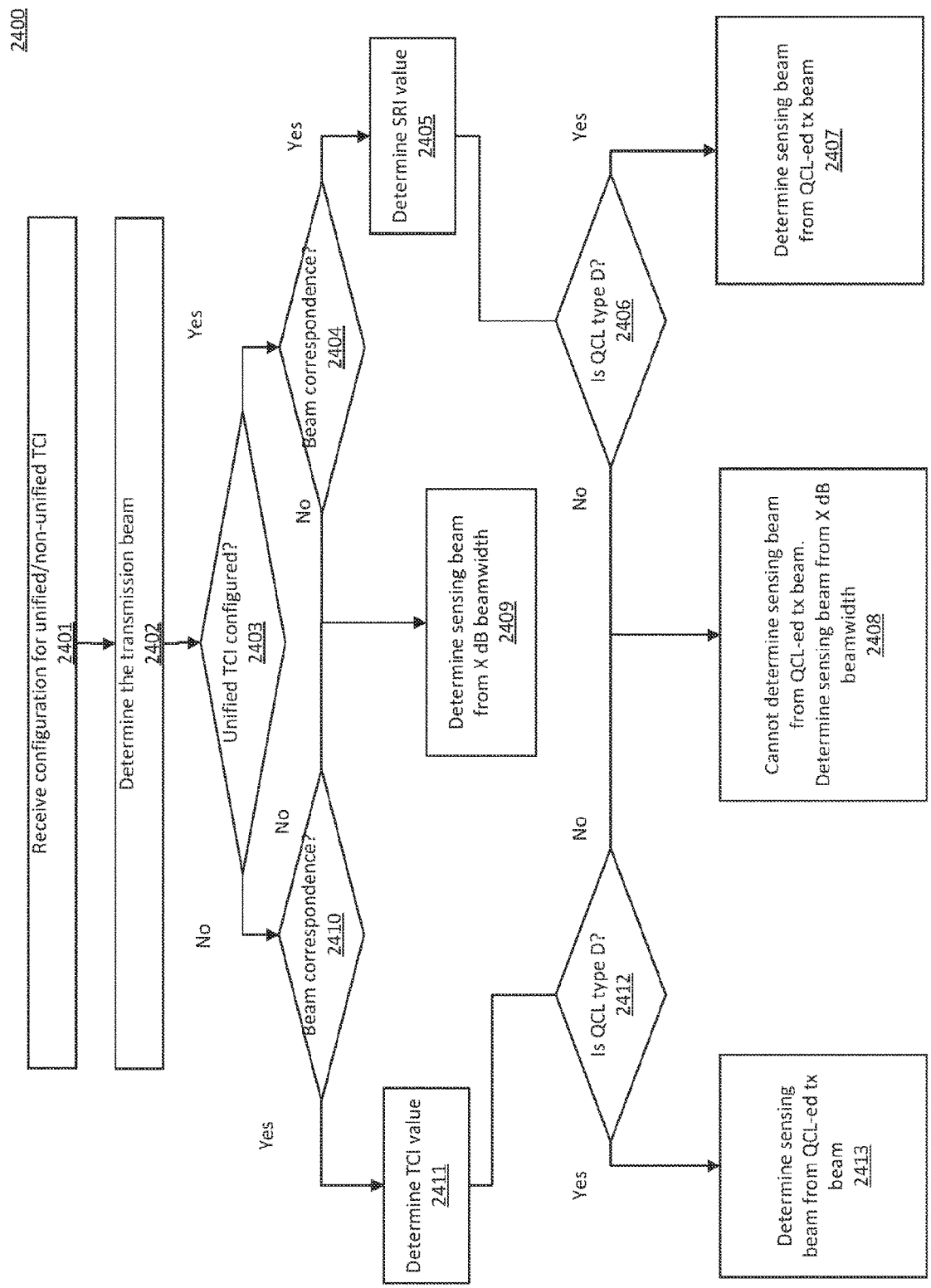
FIG. 24 shows an example method of determining a sensing beam from a transmission beam using a non-unified TCI and unified TCI approach.

FIG. 24 shows an example method of determining a sensing beam from a transmission beam using non-unified TCI and unified TCI approaches 2400. The UE may receive a configuration for a unified/non-unified TCI (step 2401). The UE may determine the transmission beam (step 2402). If a unified TCI is configured (step 2403), then the UE may further determine whether beam correspondence is assumed or not assumed, or indicated or not indicated (step 2404). If beam correspondence is not assumed, not indicated, or not supported (step 2404), the UE may determine a sensing beam from a certain dB beamwidth or the like, e.g., X dB beamwidth (step 2409). If beam correspondence is assumed, indicated, or supported (step 2404), then the UE may determine the SRI value (step 2405). If QCL is associated with QCL type D (step 2406), then the UE may determine the sensing beam from the QCL-ed transmission beam (step 2407). If QCL is not associated or is not associated with QCL type D (step 2406), then the UE may not determine the sensing beam from the QCL, and the UE may determine a sensing beam from a certain dB beamwidth or the like, e.g., X dB beamwidth (step 2408).

If a unified TCI is not configured (step 2403), then the UE may further determine whether beam correspondence is assumed or not assumed, indicated or not indicated (step 2410). If beam correspondence is not assumed, indicated, or supported (step 2410), the UE may determine a sensing beam from a certain dB beamwidth or the like, e.g., X dB beamwidth (step 2409). If beam correspondence is assumed, indicated, or supported (step 2410), then the UE may determine the TCI value (step 2411). If QCL is associated with QCL type D (step 2412), then the UE may determine the sensing beam from the QCL-ed transmission beam (step 2413). If QCL is not associated or is not associated with QCL type D (step 2412), then the UE may not determine the sensing beam from the QCL, and the UE may determine a sensing beam from a certain dB beamwidth or the like, e.g., X dB beamwidth (step 2408).

The relative relationship between a sensing beam or beams and the transmission beam or beams may be used to determine the sensing beam for LBT from the transmission beam. The sensing beam or beams may overlap, partially overlap, include and/or cover the transmission beam or beams. A certain dB beamwidth approach or the like may be used. For example, the angle included in the W1 dB beamwidth of the transmission beam may be included in the Z1 dB beamwidth of the sensing beam. W1 may be 3 dB or other values. Z1 may be 3 dB or other values. The sensing beam gain measured along the direction of peak transmission direction may be W2 dB of the transmission beam gain. W2 may be 3 dB or other values. The sensing beam gain may be measured in one or more directions where the transmission beam EIRP may be within W3 dB of the peak EIRP. W3 may be 3 dB or other values. The sensing beam gain measured along the chosen directions may be W4 dB of the transmission beam gain in those directions. W4 may be 3 dB or other values. The sensing beam gain may also be measured in one or more directions where the transmission beam EIRP may be within W5 dB of the peak EIRP and the sensing beam gain measured along the chosen directions may be Z5 dB of the peak sensing beam gain. W5 may be 3 dB or other values. Z5 may be 3 dB or other values. Sensing beam may have the minimum Z6 dB beamwidth which may contain all beam peak directions of transmission beams. Z6 may be 3 dB or other values. For example, the gNB may schedule and/or trigger uplink PUCCH and/or SRS transmissions with the DCI carried in the PDCCH. The gNB may indicate an LBT category, a clear channel assessment (CCA), or an enhanced CCA (eCCA) in the DCI to the UE. The UE may perform a corresponding LBT, CCA, or eCCA based on the indication in the DCI for the scheduled and/or triggered UL transmission. If LBT succeeds, the UE may transmit the receiver assistance information either implicitly or explicitly in the uplink control PUCCH or the uplink sounding reference signal SRS. If the receiver assistance information has a payload larger than or equal to K bits, then the uplink control PUCCH may be used to indicate the LBT results. If the receiver assistance information has a payload smaller than K bits, then the SRS may be used to indicate the LBT results. For example, the value of K may be two or three. The gNB may detect the scheduled UL transmission to indicate if the UE succeeds the LBT, CCA, or eCCA. After receiving the receiver assistance information at the gNB, the downlink transmission from the gNB may start. The downlink transmission may be assigned with the same DL DCI that may schedule and/or trigger the first uplink PUCCH and/or SRS transmission. The LBT, CCA or eCCA may be performed for the first uplink PUCCH and/or SRS transmission. The downlink transmission may be assigned with the different downlink control DCI that may be different from the DCI which may schedule and/or trigger the first UL PUCCH and/or SRS transmission.

In another example, the gNB may schedule and/or trigger uplink PUSCH transmissions with the DCI carried in the PDCCH. The gNB may indicate an LBT category, a CCA, or an eCCA in the DCI to UE. The UE may perform a corresponding LBT, CCA or eCCA based on the indication in DCI for the scheduled and/or triggered uplink PUSCH transmission. If LBT succeeds, the UE may transmit the receiver assistance information in the uplink PUSCH to indicate the LBT results. The gNB may detect the scheduled uplink transmission to indicate if the UE succeeds the LBT, CCA, or eCCA. After receiving the receiver assistance information at the gNB, the downlink transmission from gNB may start. The downlink transmission may be assigned with the same DL DCI that may schedule and/or trigger the uplink PUSCH transmission. The LBT, CCA, or eCCA may be performed for the uplink PUSCH transmission. The downlink transmission may be assigned with the different downlink control DCI that may be different from the DCI which may schedule and/or trigger the uplink PUSCH transmission. There may be one or multiple PDSCH transmissions that are scheduled by single DCI or multiple DCIs. There may be one or multiple PUSCH transmission.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHZ, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHZ, with cmWave and mmWave specific design optimizations.

3GPP has identified a variety of use cases that NR is expected to support, resulting in a wide variety of user experience requirements for data rate, latency, and mobility.

The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 25A:
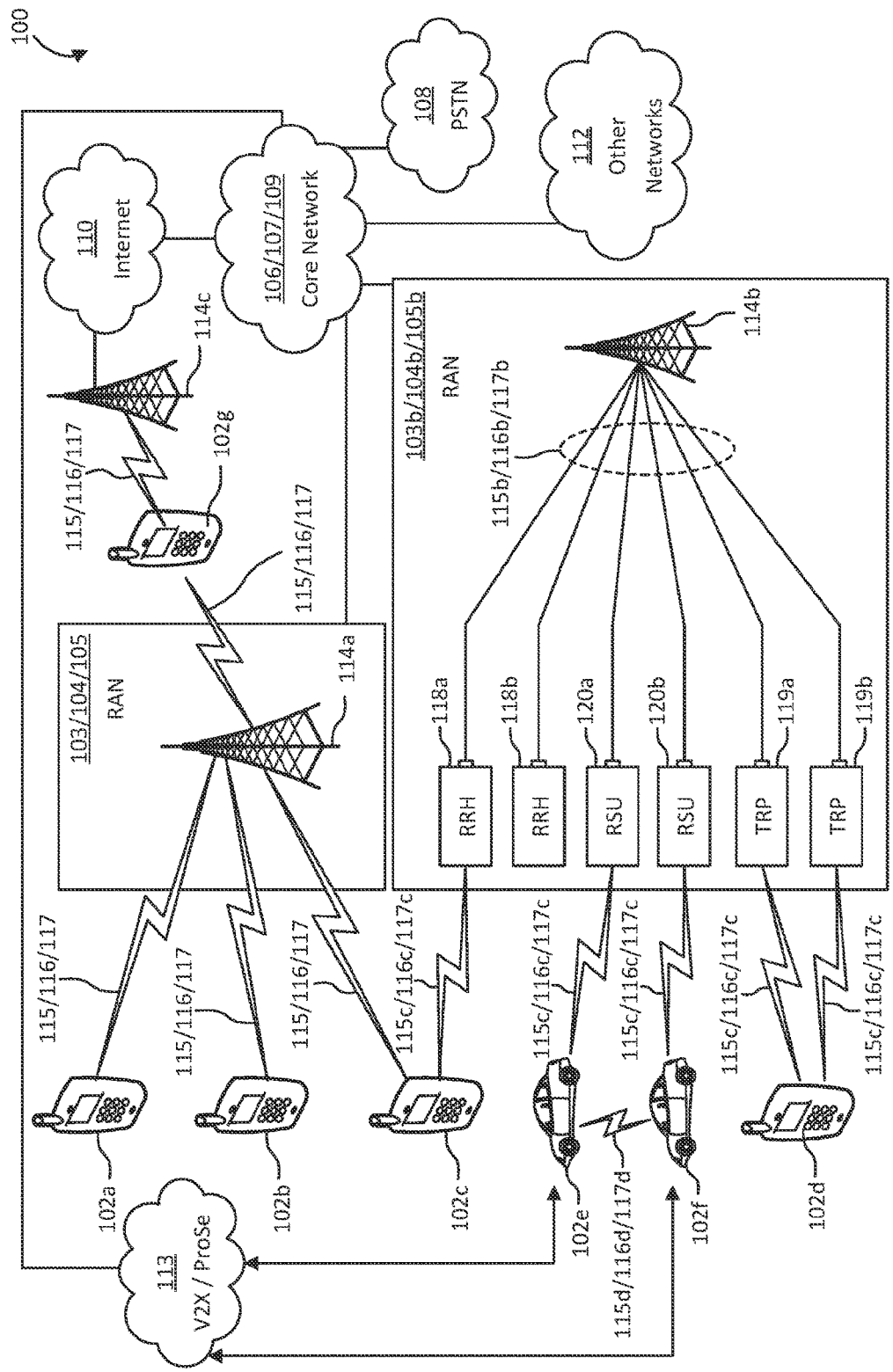
FIG. 25A illustrates one embodiment of an example communications system in which the methods and apparatuses described and claimed herein may be embodied.

FIG. 25A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 25A-25E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 25A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 25A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VOIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 25A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 25A may be configured to communicate with the base station 114a, which may employ a cellular-based radio technology, and with the base station 114c, which may employ an IEEE 802 radio technology.

Figure 25B:
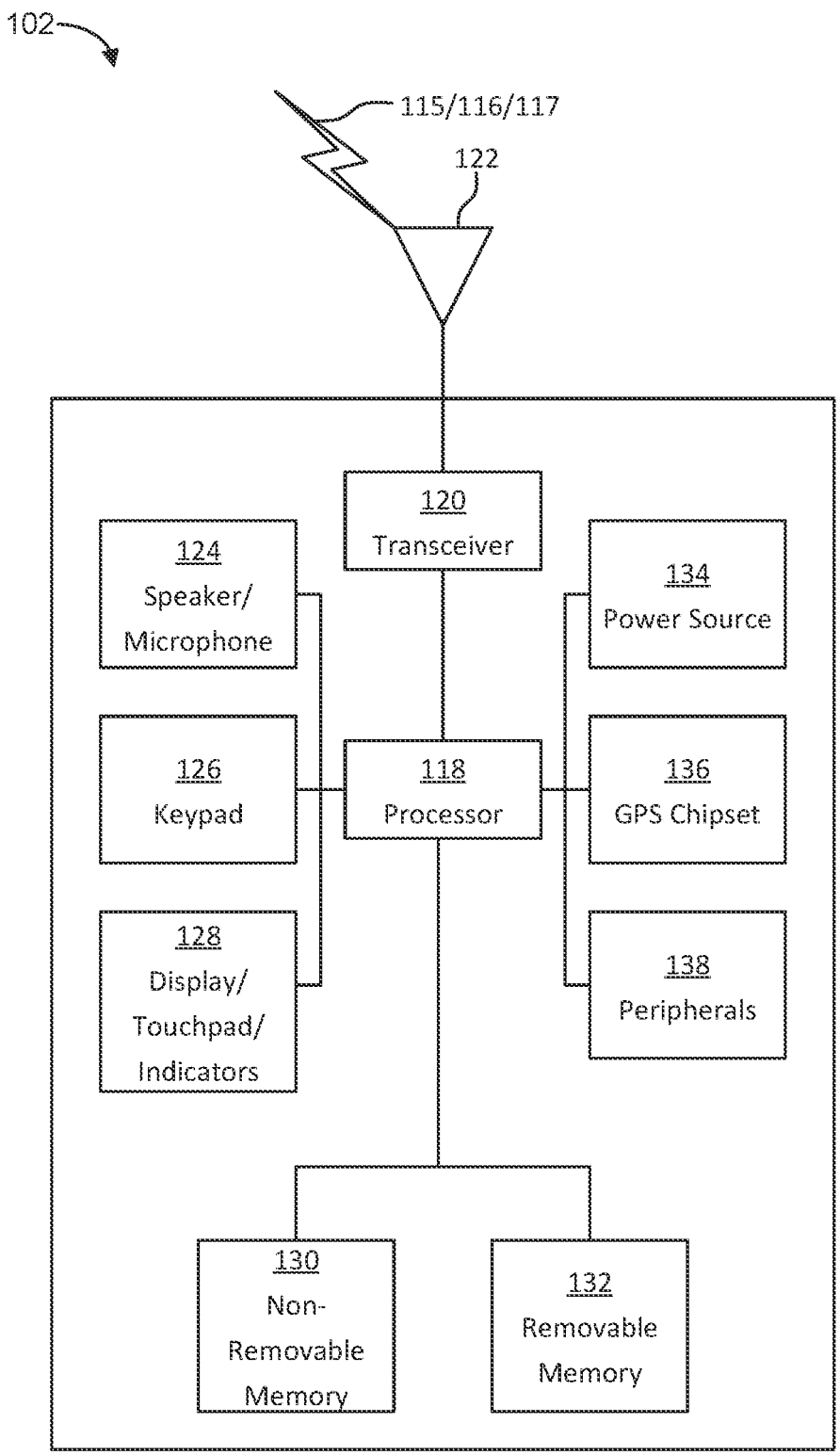
FIG. 25B is a block diagram of an example apparatus or device configured for wireless communications in accordance with the embodiments illustrated herein, such as for example, a wireless transmit/receive unit (WTRU)

FIG. 25B is a block diagram of an example apparatus or device configured for wireless communications in accordance with the embodiments illustrated herein, such as for example, a WTRU 102. As shown in FIG. 25B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 25B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 25B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 25B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 25C:
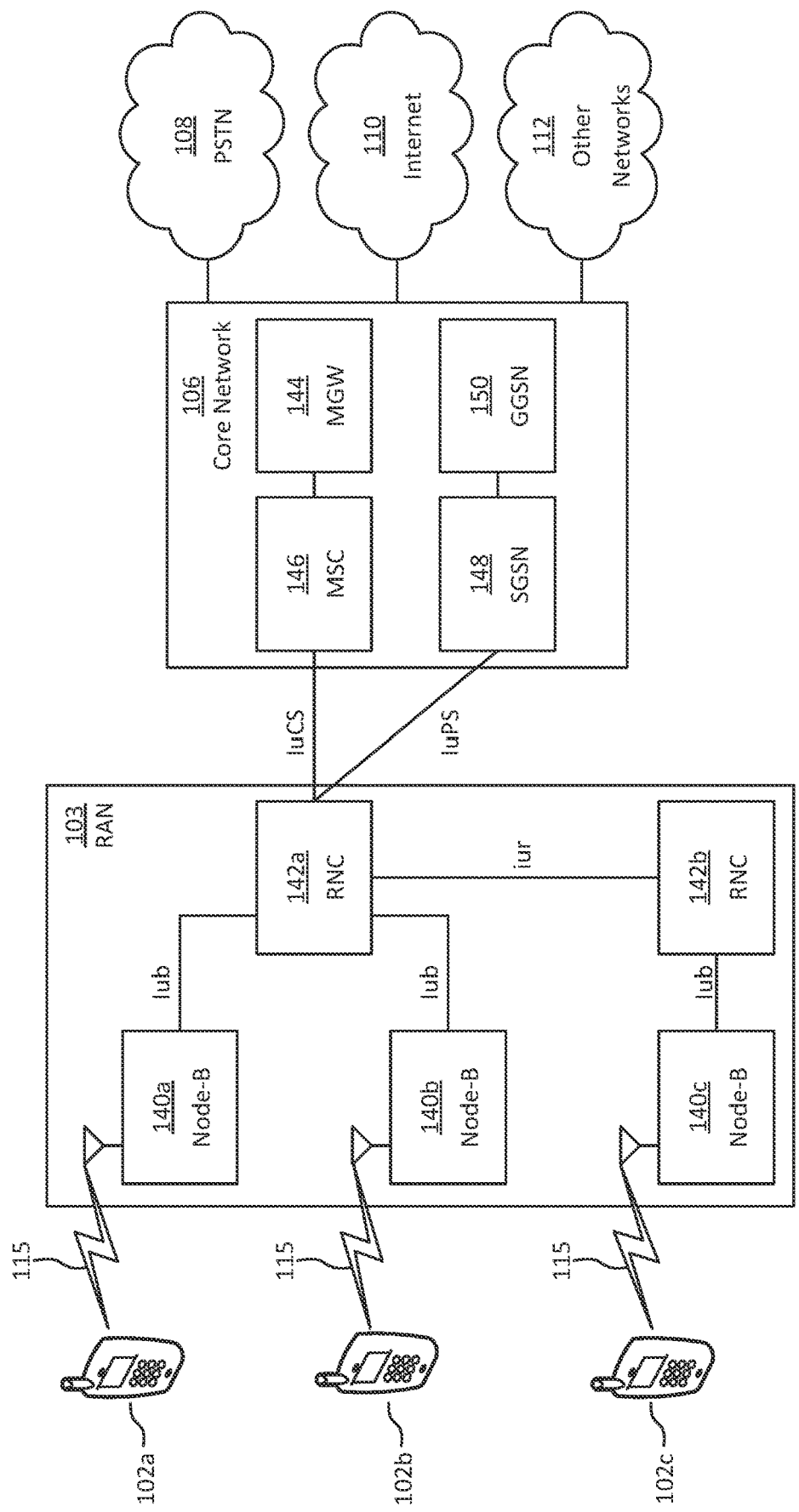
FIG. 25C is a system diagram of a RAN and a core network according to an embodiment.

FIG. 25C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 25C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 25C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 25C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 25D:
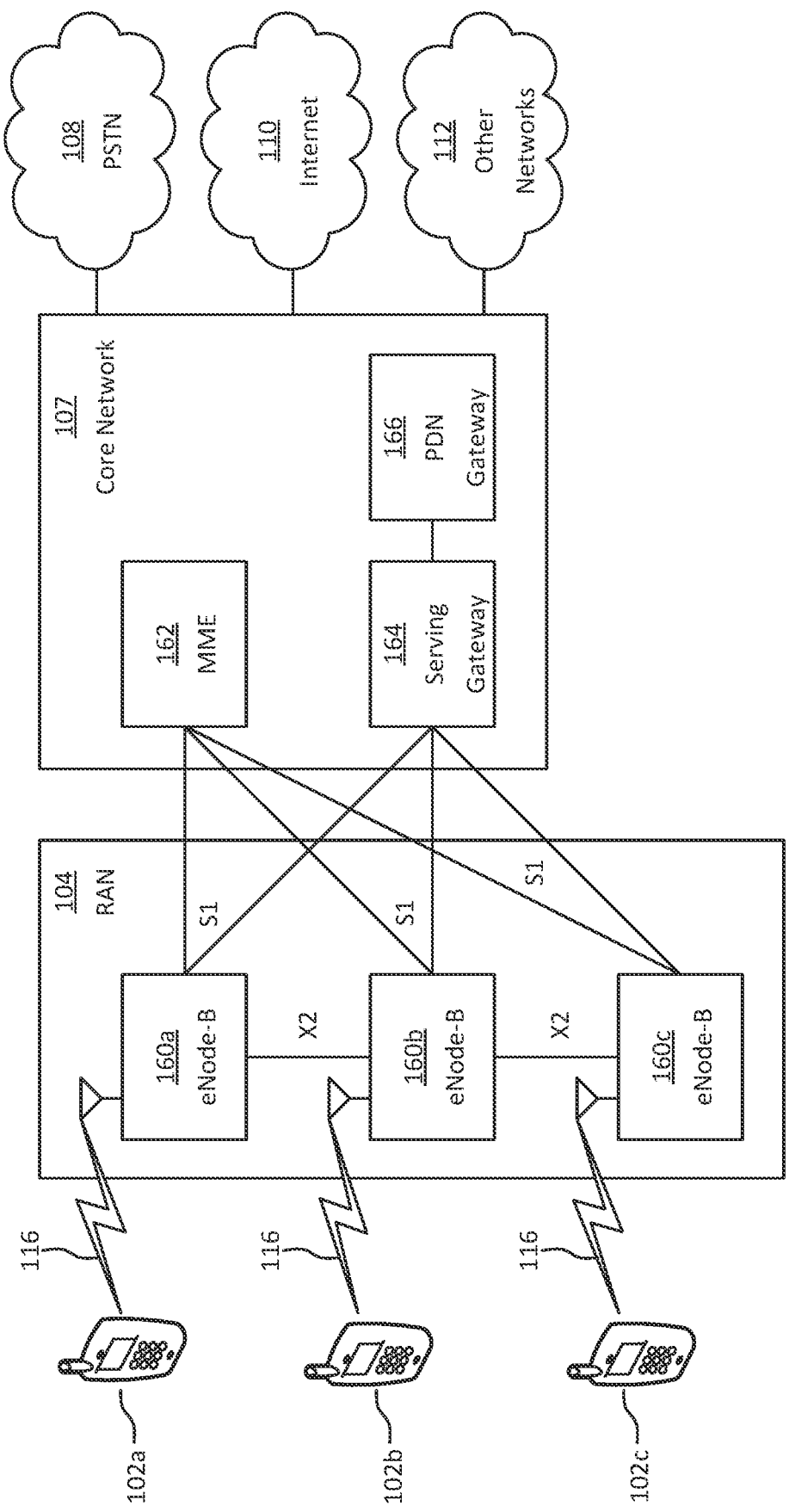
FIG. 25D is a system diagram of a RAN and a core network according to an embodiment.

FIG. 25D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 25D, the eNode-Bs 160a, 160b, 160c may communicate with one another over an X2 interface.

The core network 107 shown in FIG. 25D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 25E:
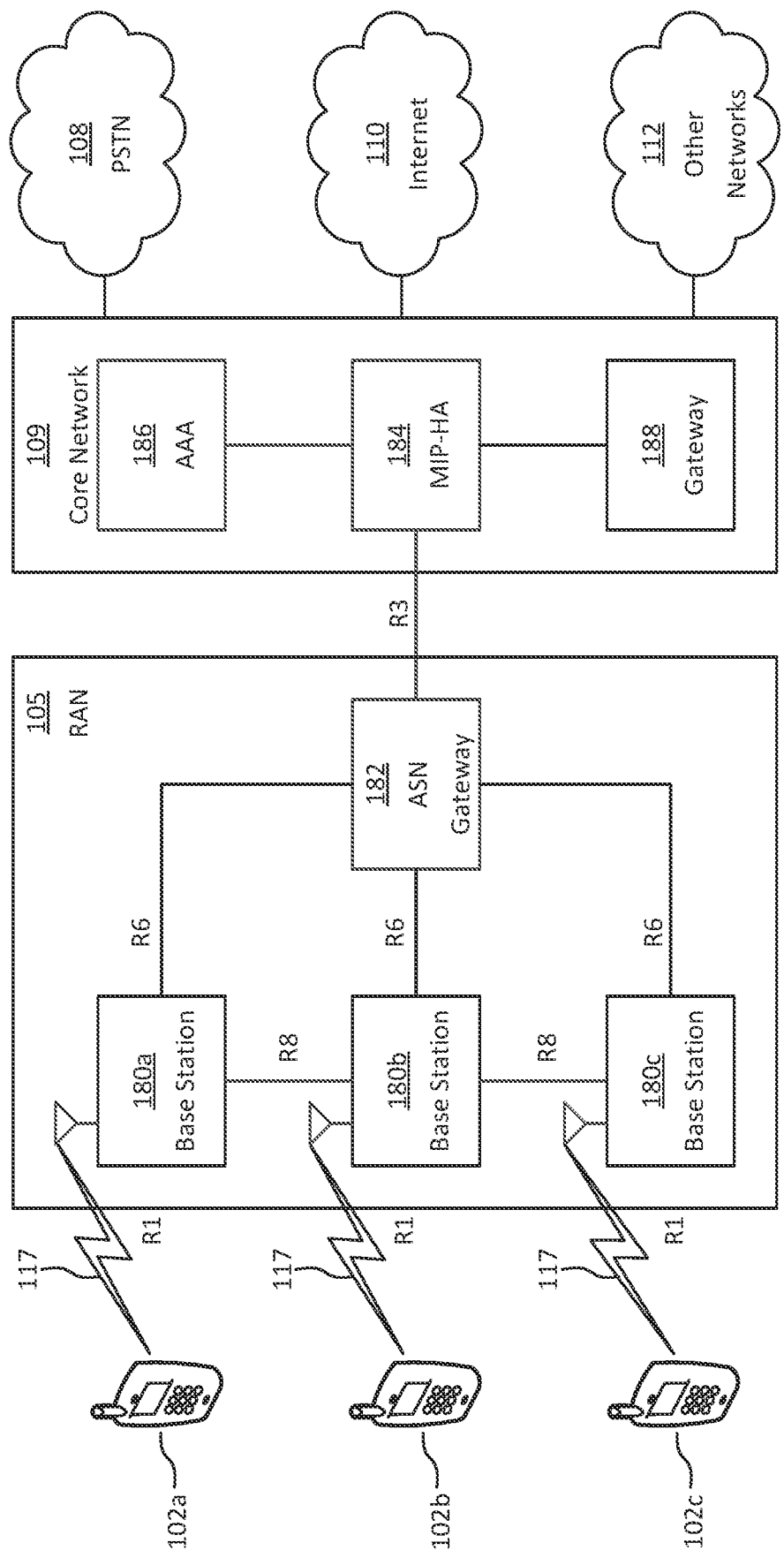
FIG. 25E is a system diagram of a RAN and the core network according to an embodiment.

FIG. 25E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 25E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 25E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 25E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 25A, 25C, 25D, and 25E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 25A, 25B, 25C, 25D, and 25E are provided by way of example only, and it is understood that the subject matter disclosed and claimed herein may be embodied or implemented in any similar communication system, whether presently defined or defined in the future.

Figure 25F:
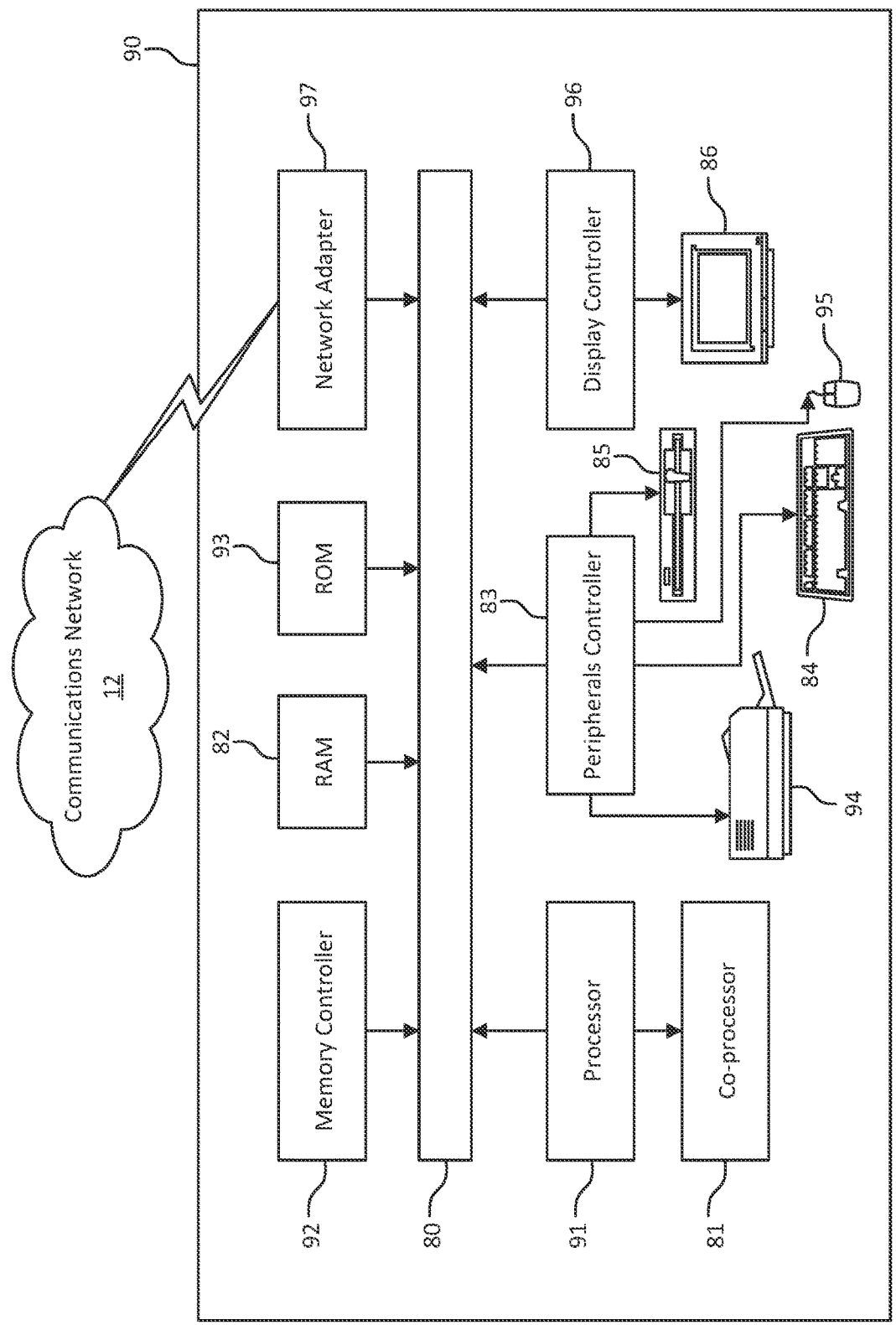
FIG. 25F is a block diagram of an exemplary computing system in which one or more apparatuses of the communications networks illustrated in FIGS. 25A, 25C, 25D and 25E may be embodied.

FIG. 25F is a block diagram of an exemplary computing system 90 in which one or more apparatuses of the communications networks illustrated in FIGS. 25A, 25C, 25D and 25E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 25A, 25B, 25C, 25D, and 25E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 25G:
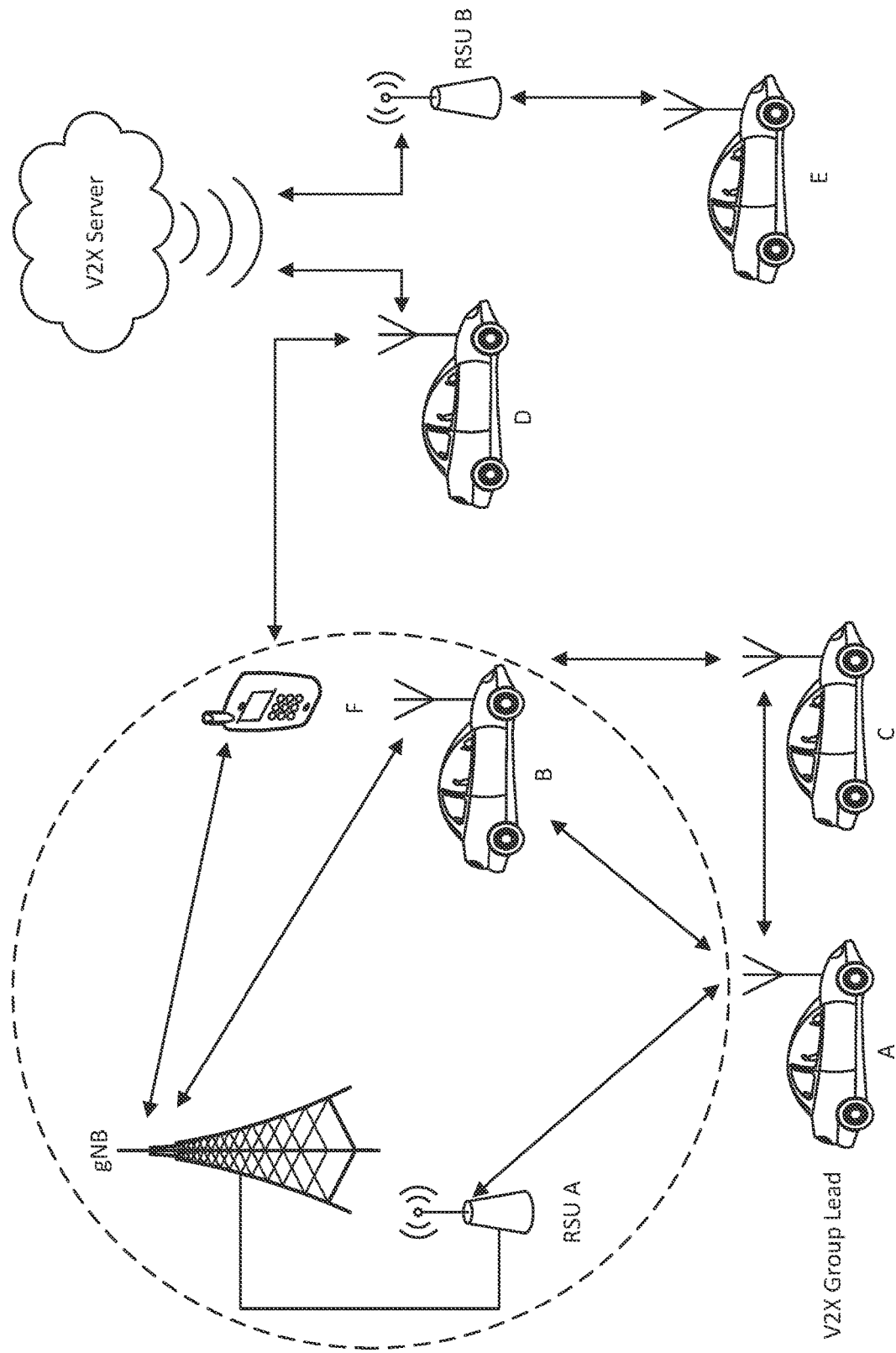
FIG. 25G illustrates one embodiment of an example communications system in which the methods and apparatuses described and claimed herein may be embodied.

FIG. 25G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface. It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU), comprising a transceiver and one or more processors, configured to:
   receive, from a base station, downlink control information (DCI) indicating: a listen before talk (LBT) mode indication, an LBT sub-mode indication, a ready to receive (RTR) indication, and a plurality of thresholds, wherein each threshold of the plurality of thresholds is associated with a respective level of hidden node detection;
   perform, based on the LBT mode indication and the LBT sub-mode indication, a measurement; and
   on condition that the RTR indication indicates that an RTR is requested:
      determine, based on a threshold of the plurality of thresholds, a level of hidden node detection indicated by the measurement, and
      send an indication of the determined level of hidden node detection.

2. The WTRU of claim 1, wherein the determined level of hidden node detection comprises: no hidden node detection, light hidden node detection, moderate hidden node detection, or severe hidden node detection.

3. The WTRU of claim 1, wherein the LBT mode indication indicates whether LBT is to be performed.

4. The WTRU of claim 1, wherein the LBT sub-mode indication indicates: directional LBT with receiver assistance, directional LBT without receiver assistance, omni-directional LBT with receiver assistance, or omni-directional LBT without receiver assistance.

5. The WTRU of claim 1, wherein RTR indication indicates whether receiver assistance is requested.

6. The WTRU of claim 1, wherein the indication of the determined level of hidden node detection is sent via a physical uplink control channel (PUCCH).

7. The WTRU of claim 1, further configured to:
   receive, in response to the indication of the determined level of hidden node detection, from the base station, data.

8. A method for use in a wireless transmit/receive unit (WTRU), the method comprising:
   receiving, from a base station, downlink control information (DCI) indicating: a listen before talk (LBT) mode indication, an LBT sub-mode indication, a ready to receive (RTR) indication, and a plurality of thresholds, wherein each threshold of the plurality of thresholds is associated with a respective level of hidden node detection;
   performing, based on the LBT mode indication and the LBT sub-mode indication, a measurement; and
   on condition that the RTR indication indicates that an RTR is requested:
      determining, based on a threshold of the plurality of thresholds, a level of hidden node detection indicated by the measurement, and
      sending an indication of the determined level of hidden node detection.

9. The method of claim 8, wherein the determined level of hidden node detection comprises: no hidden node detection, light hidden node detection, moderate hidden node detection, or severe hidden node detection.

10. The method of claim 8, wherein the LBT mode indication indicates whether LBT is to be performed.

11. The method of claim 8, wherein the LBT sub-mode indication indicates: directional LBT with receiver assistance, directional LBT without receiver assistance, omni-directional LBT with receiver assistance, or omni-directional LBT without receiver assistance.

12. The method of claim 8, wherein RTR indication indicates whether receiver assistance is requested.

13. The method of claim 8, wherein the indication of the determined level of hidden node detection is transmitted via a physical uplink control channel (PUCCH).

14. The method of claim 8, further comprising:
receiving, in response to the indication of the determined level of hidden node detection, from the base station, data.

15. An apparatus, comprising a transceiver and one or more processors, configured to:
transmit, to a wireless transmit/receive unit (WTRU), downlink control information (DCI) indicating: a listen before talk (LBT) mode indication, an LBT sub-mode indication, a ready to receive (RTR) indication indicating that an RTR is requested, and a plurality of thresholds, wherein each threshold of the plurality of thresholds is associated with a respective level of hidden node detection;
receive, from the WTRU, based on the LBT mode indication and the LBT sub-mode indication, an indication of a level of hidden node detection based on a threshold of the plurality of thresholds; and
send, to the WTRU, in response to the indication of the determined level of hidden node detection, data.

16. The apparatus of claim 15, wherein the determined level of hidden node detection comprises: no hidden node detection, light hidden node detection, moderate hidden node detection, or severe hidden node detection.

17. The apparatus of claim 15, wherein the LBT mode indication indicates whether LBT is to be performed.

18. The apparatus of claim 15, wherein the LBT sub-mode indication indicates: directional LBT with receiver assistance, directional LBT without receiver assistance, omni-directional LBT with receiver assistance, or omni-directional LBT without receiver assistance.

19. The apparatus of claim 15, wherein RTR indication indicates whether receiver assistance is requested.

20. The apparatus of claim 15, wherein the indication of the determined level of hidden node detection is received via a physical uplink control channel (PUCCH).

* * * * *